United States Patent
Redfern

(10) Patent No.: US 11,585,246 B2
(45) Date of Patent: Feb. 21, 2023

(54) METHOD OF MANUFACTURING A BEARING PIN WITH AN EXTERNAL LUBRICATION CHANNEL

(71) Applicant: Deere & Company, Moline, IL (US)

(72) Inventor: Kyle D. Redfern, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/234,515

(22) Filed: Apr. 19, 2021

(65) Prior Publication Data

US 2022/0333506 A1  Oct. 20, 2022

(51) Int. Cl.
F16C 33/00 (2006.01)
F01L 1/18 (2006.01)

(52) U.S. Cl.
CPC ............... *F01L 1/18* (2013.01); *F16C 33/00* (2013.01)

(58) Field of Classification Search
CPC .................................. F01L 1/18; F16C 33/00
See application file for complete search history.

(56) References Cited

U.S. PATENT DOCUMENTS

| | | | |
|---|---|---|---|
| 6,056,442 A | 5/2000 | Ono et al. | |
| 9,662,753 B1 * | 5/2017 | Kloeppel | ........... G11B 19/2036 |

FOREIGN PATENT DOCUMENTS

| | | |
|---|---|---|
| KR | 19980082370 A | 12/1998 |
| KR | 19990004027 A | 1/1999 |

OTHER PUBLICATIONS

Centerless Grinding, https://en.wikipedia.org/wiki/Centerless_grinding, Wikipedia, Nov. 3, 2020 (3 pages).
Construction and Working of Centreless Grinding Process Tutorial, https://www.youtube.com/watch?v=EdelqDNouD4, YouTube, Apr. 24, 2020 (1 page).
Sandvik Coromant Milling Tips Technique—Helical Interpolation, https://www.youtube.com/watch?v=liBecLivkc4, YouTube, Mar. 17, 2011 (1 page).
Global Spec Section 5: Interpolation | Engineering360, CNC Simplified, Chapter List, © Copyright 2021 (2 pages).
End Mill, https://en.wikipedia.org/wiki/End_mill, Wikipedia, Jun. 7, 2020 (3 pages).
MSC Cutting Tool Technologies, Arbor Hole Connection, 3/16" Cutting Width, 0.72" Depth of Cut, 3" Cutter Diam, 1" Hole Diam, Indexable Slotting Cutter, undated admitted prior art (2 pages).

* cited by examiner

*Primary Examiner* — Rick K Chang
(74) *Attorney, Agent, or Firm* — Klintworth & Rozenblat IP LLP

(57) ABSTRACT

A method of manufacturing a bearing pin with an external lubrication channel and the bearing pin formed thereby are disclosed. The method includes fixing a rotational orientation of the bearing pin along a pin axis, cutting an outer surface of the bearing pin in a first straight line across a first convex portion thereof to create a first open external groove of the lubrication channel; and cutting an outer surface of the bearing pin in a second straight line across a second convex portion thereof to create a second open external groove of the lubrication channel. The grooves have a concave sectional profile and circumferential open ends disposed intermediate and not intersecting the ends of the bearing pin.

9 Claims, 16 Drawing Sheets

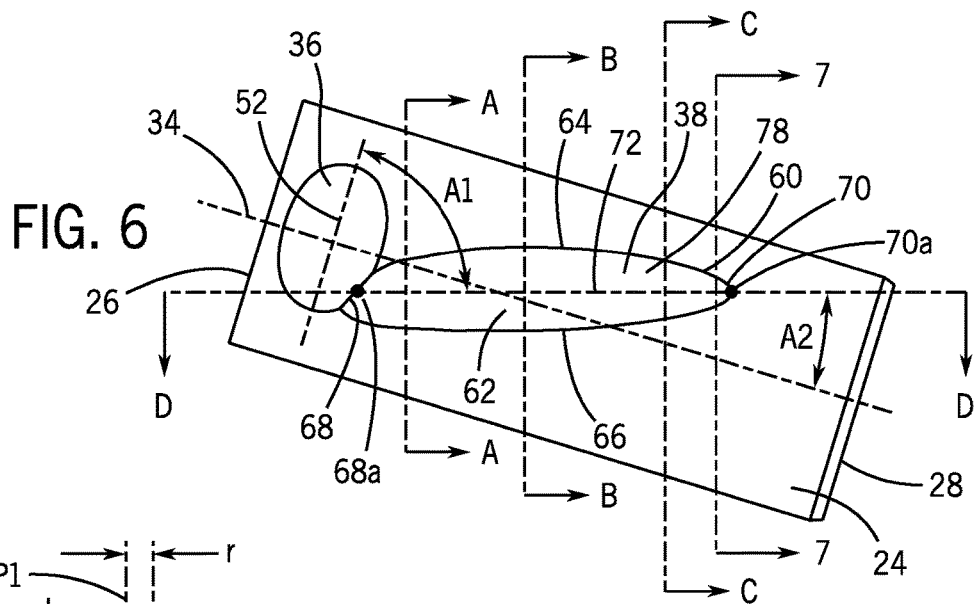
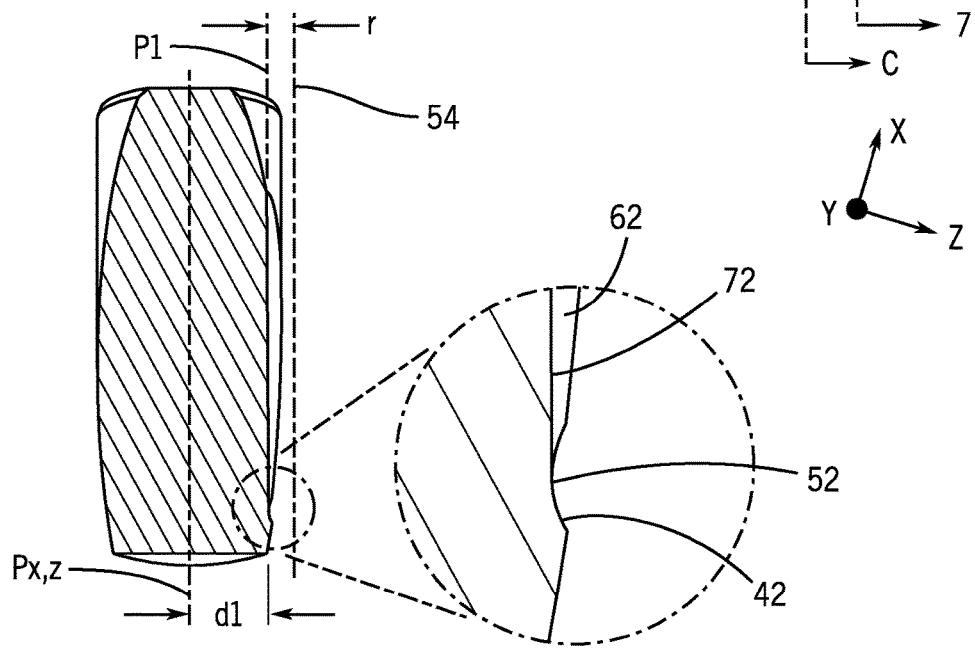
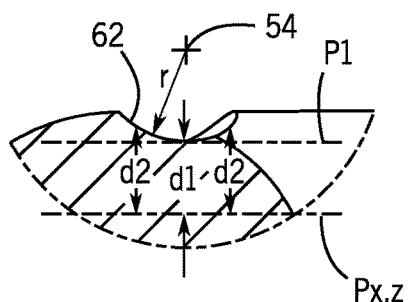 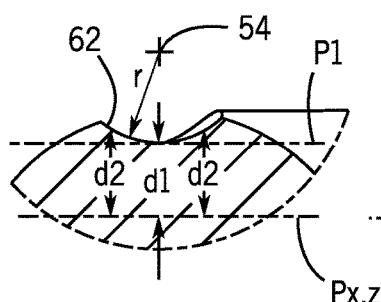 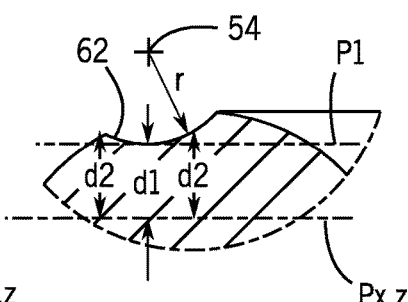
FIG. 6A          FIG. 6B          FIG. 6C

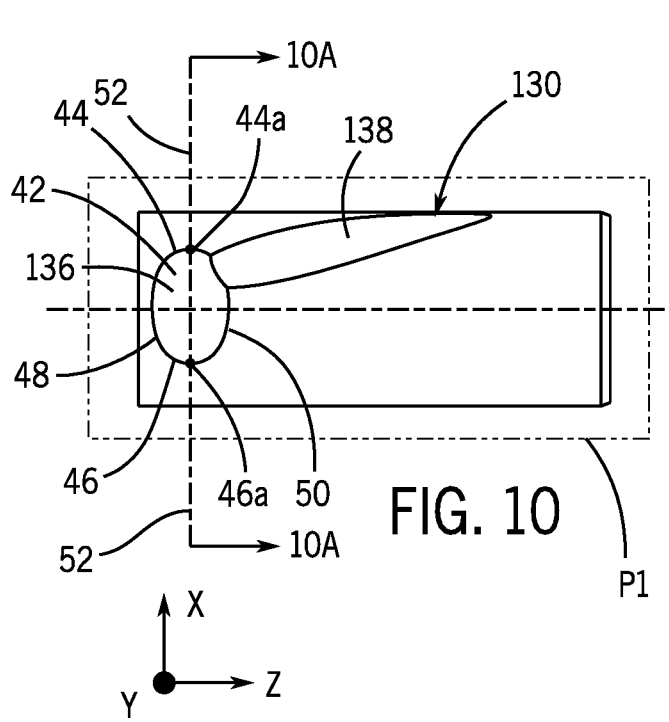
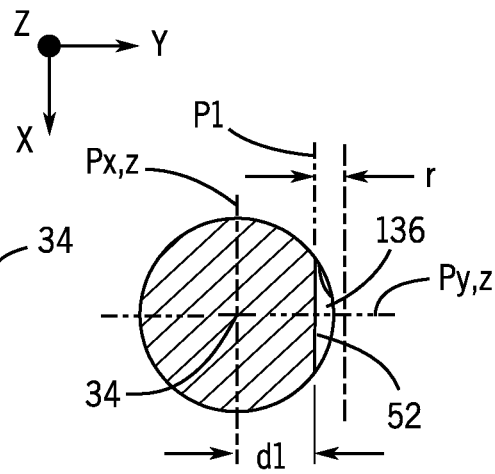
FIG. 10
FIG. 10A
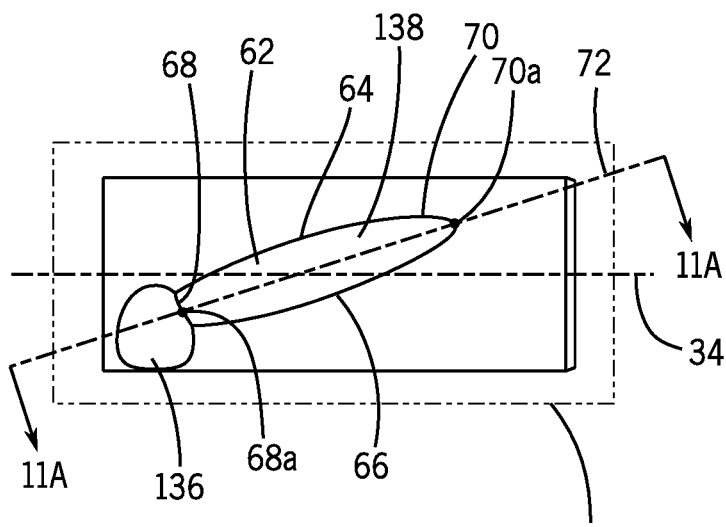
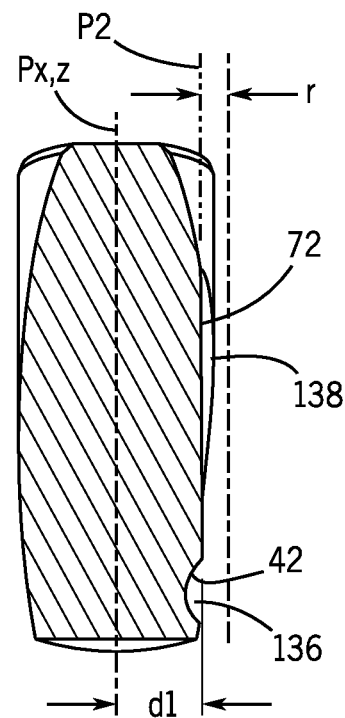
FIG. 11
FIG. 11A

METHOD OF MANUFACTURING A BEARING PIN WITH AN EXTERNAL LUBRICATION CHANNEL

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to a lubrication channel in a bearing pin which rotatably supports a roller thereon.

BACKGROUND OF THE DISCLOSURE

Rollers used in various applications (e.g., rockers or followers of engine valvetrains) may be mounted on a shaft or bearing pin. To reduce wear and extend the useful life of the roller, lubrication may be provided to smooth rotation of the roller. The lubrication may be communicated to the inner diameter of the roller between the shaft or pin and the roller intermittently or continuously.

SUMMARY OF THE DISCLOSURE

The disclosure provides a bearing pin, with a lubrication channel, which rotatably supports a roller thereon.

The method includes fixing a rotational orientation of the bearing pin along a pin axis, the bearing pin having an outer surface extending about the pin axis between opposite ends; cutting the outer surface of the bearing pin in a first straight line across a first convex portion of the outer surface to create a first open external groove of the lubrication channel that has a concave sectional profile and circumferential open ends disposed intermediate and not intersecting the ends of the bearing pin; and cutting the outer surface of the bearing pin in a second straight line across a second convex portion of the outer surface to create a second open external groove of the lubrication channel that has a concave sectional profile and circumferential open ends disposed intermediate and not intersecting the ends of the bearing pin, the second open external groove intersecting the first open external groove.

The bearing pin includes a pin body having an outer surface extending about a pin axis between opposite ends; and an open external lubrication channel disposed in the outer surface of the pin body. The lubrication channel has a first groove extending in a first straight line across a first convex portion of the outer surface, the first groove having a concave sectional profile and circumferential open ends disposed intermediate and not intersecting the ends of the pin body; and a second groove extending in a second straight line across a second convex portion of the outer surface, the second groove having a concave sectional profile and circumferential open ends disposed intermediate and not intersecting the ends of the pin body, the second groove intersecting the first groove.

The details of one or more embodiments are set forth in the accompanying drawings and the description below.

Other features and advantages will become apparent from the description, the drawings, and the claims.

BRIEF DESCRIPTION OF THE DRAWINGS

FIG. 6 is an alternate plan view of the bearing pin;

FIGS. 6A-6D are cross-sectional views along lines A-A, B-B, C-C, and D-D, respectively of FIG. 6;

FIG. 10 is a plan view of the bearing pin of FIG. 9B;

FIG. 10A is a cross-sectional view along line 10A-10A of FIG. 10;

FIG. 11 is an alternate plan view of the bearing pin of FIG. 9B;

FIG. 11A is a cross-sectional view along line 11A-11A of FIG. 11;

Like reference symbols in the various drawings indicate like elements.

DETAILED DESCRIPTION

Figure 1:
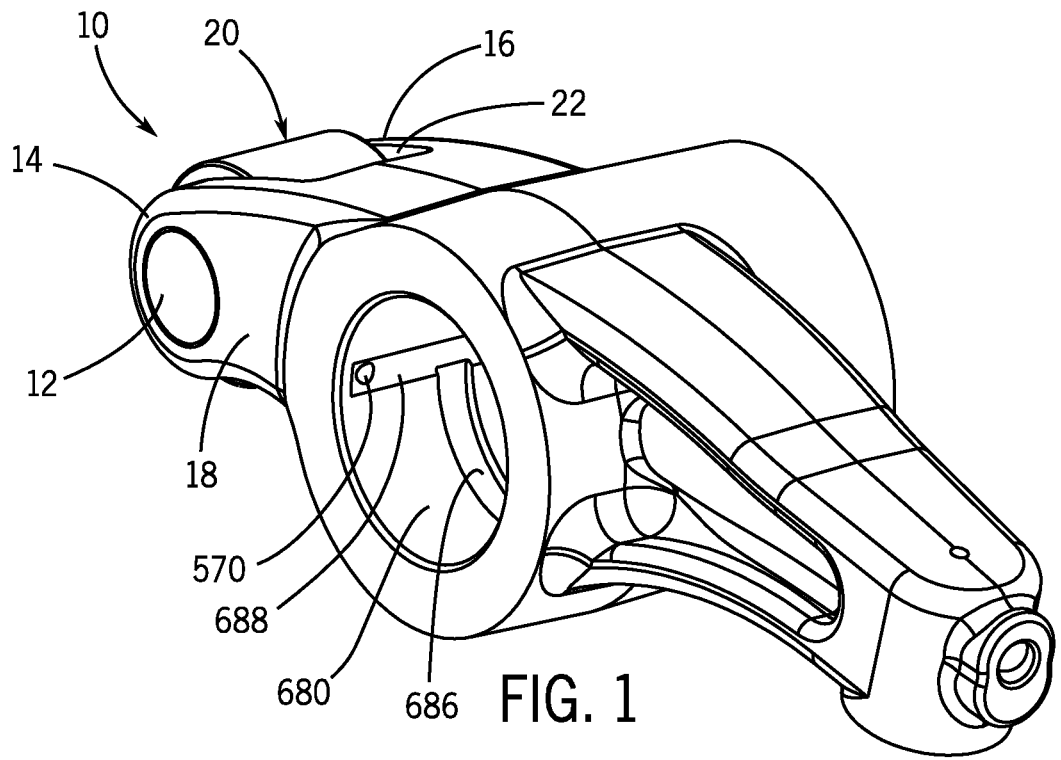
FIG. 1 is an isometric view of an example lubricated bearing pin and roller assembly.
Figure 2:
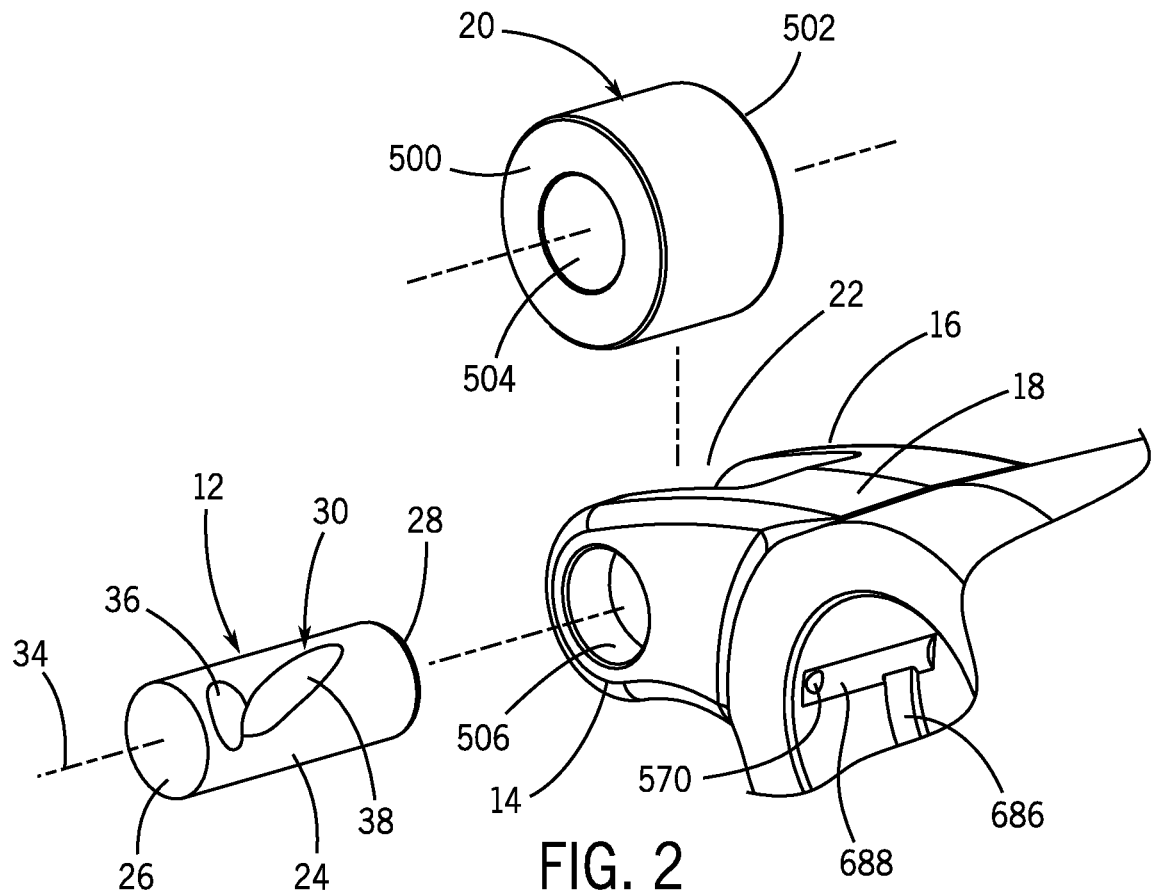
FIG. 2 is a partial, exploded isometric view of the example lubricated bearing pin and roller assembly.

The following describes one or more example embodiments of the disclosed bearing pin, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "longitudinal," "inner," "outer," "radial," "axial," "circumferential," "lateral," and "transverse" may be used. Such terms are defined, at least in part, with respect to a centerline of a bearing pin. As used herein, the term "longitudinal" indicates an orientation along the length of the bearing pin; the term "lateral" indicates an orientation along a width of the bearing pin and orthogonal to the longitudinal orientation; and the term "transverse" indicates an orientation along the height of the bearing pin and orthogonal to the longitudinal and lateral orientations.

OVERVIEW

To facilitate the proper working of a roller which is rotationally mounted within a component, lubrication may be provided to the bearing pin on which the roller rotates. To deliver such lubrication, the bearing pin may be milled in order to provide a passage for lubrication to flow between the bearing pin and the roller. Often this has necessitated expensive and time consuming milling techniques, such as computerized interpolation and indexing methods, for example, computer numerical control (CNC).

In some embodiments of the present disclosure, formation of a lubrication channel may be cut into the bearing pin by using standard tools, such as a ball mill tool or a larger diameter tool, and without interpolation, which enables the lubrication channel to be economically formed in the bearing pin. The cuts used to form the lubrication channel may be made by a tool path that does not need to be computerized and allows for simplified coordinate measuring machine (CMM) measurement of the outer periphery. In addition, when a standard tool such as a ball mill tool or a larger carbide insert tool on edge is used to form the lubrication channel, a sharp edge is not formed along the lubrication channel, and instead, a shallow angle is provided. This aids in entrainment of oil within the lubrication channel, and thereby facilitates enhanced and sustained lubrication of the roller.

In some examples, after the lubrication channel is milled in the bearing pin, the bearing pin may undergo a post-milling operation to remove material that is proud of the lubrication channel so that such material cannot disrupt the film of oil formed between the roller and the bearing pin. In some cases, a centerless grinding operation is used in which the bearing pin is supported on its own outer diameter by a work rest located between a high speed grinding wheel and a slower speed regulating wheel with a smaller diameter. The non-axial or obliquely-oriented geometry of the lubrication channel disclosed herein ensures that the lubrication channel does result in "flat" areas that extend the full length of the pin body or create an unacceptable loss of axial contact between the centerless grinding wheels. The present disclosure thus allows for a bearing pin to be ground using centerless grinding.

One example in which the present disclosure may be employed advantageously is in the manufacture of engine valvetrains, in particular for the lubrication of the rollers in rockers or followers that transmit rotational motion from camshafts/cam lobes to reciprocal motion needed to raise and lower cylinder valves. The present disclosure aids in providing adequate and consistent lubrication to the rollers operating in the high-speed and elevated-temperature environments of valvetrain applications and other such critical applications.

Example Embodiment(s) of Bearing Pin and Roller Arrangement

A lubricated bearing pin and roller assembly 10 is provided and may be used in a finger follower assembly to actuate a valve in an engine and valvetrain and engine arrangement of an internal combustion engine. The lubricated bearing pin and roller assembly 10 includes a bearing pin 12 which is fixedly mounted between forked arms 14, 16 extending from a common support 18, and a roller 20 which is freely rotationally mounted on the bearing pin 12 within an opening 22 between the forked arms 14, 16.

Figure 3:
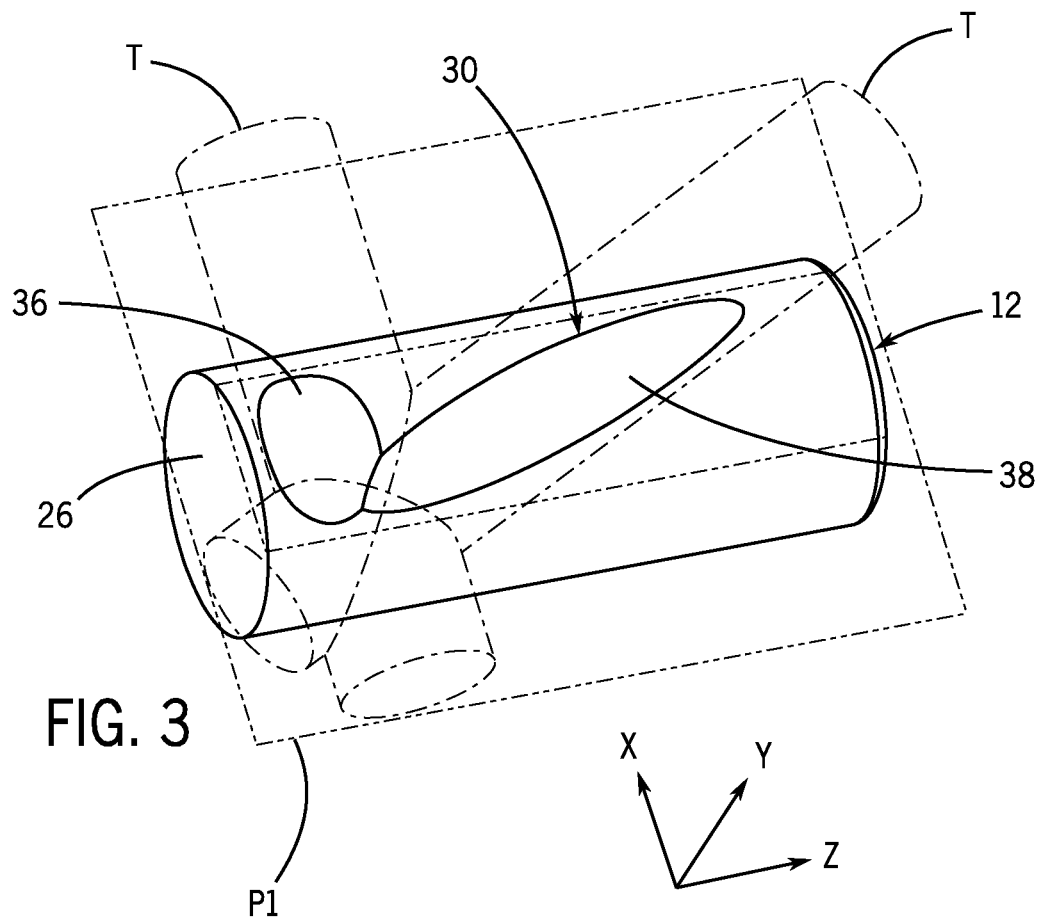
FIG. 3 is an isometric view of a bearing pin and its lubrication channel of the example lubricated bearing pin shown with a cutting tool in phantom lines.
Figure 13:
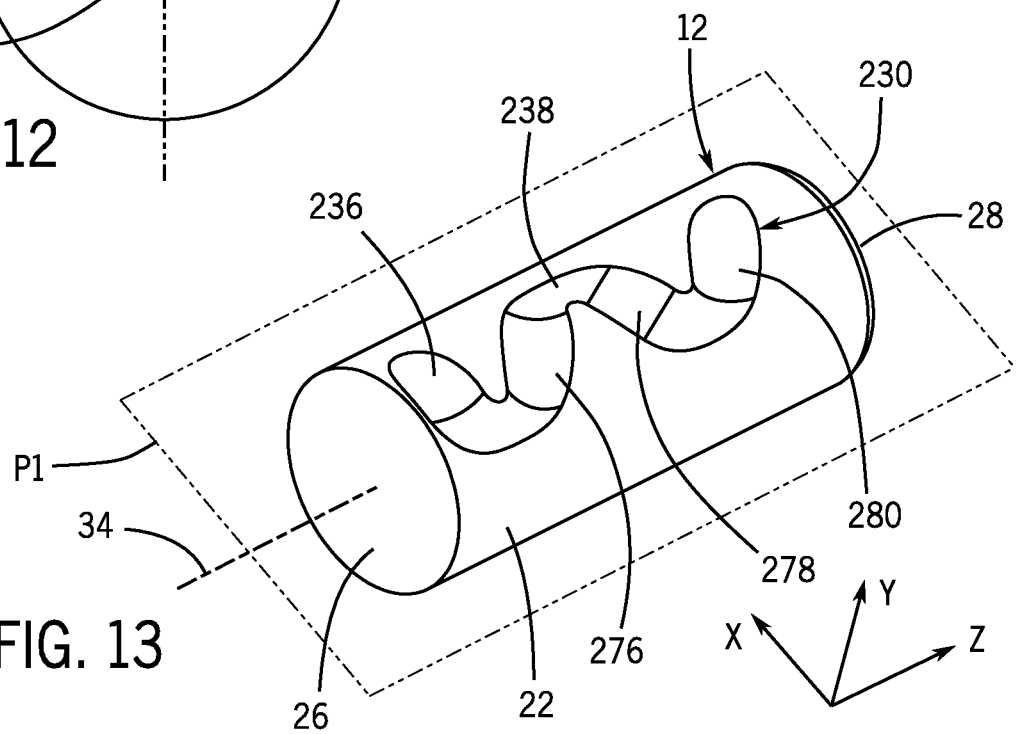
FIG. 13 is an isometric view of the bearing pin shown cut with yet another alternate lubrication channel.
Figure 15:
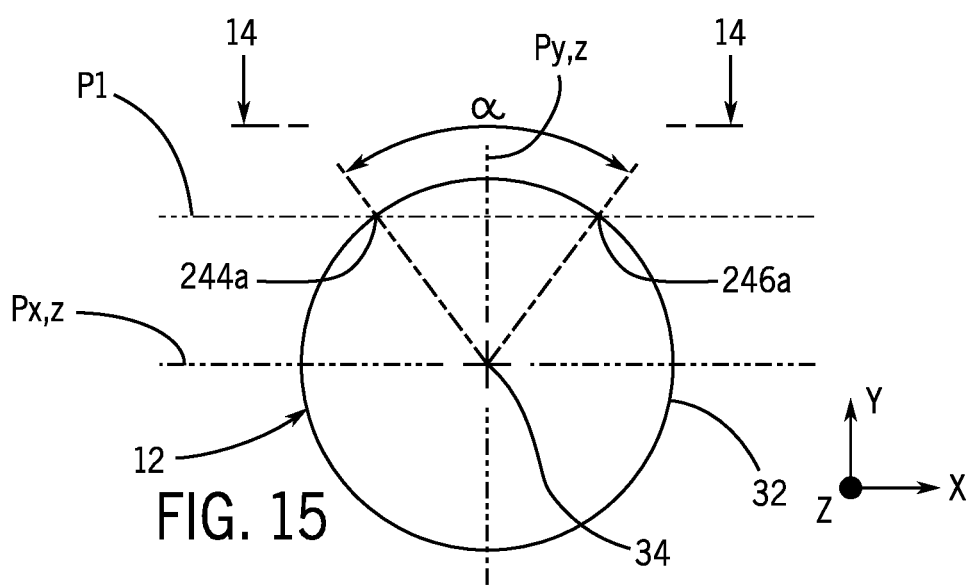
FIG. 15 is an end view of a proximal end of the bearing pin of FIG. 13.
Figure 14:
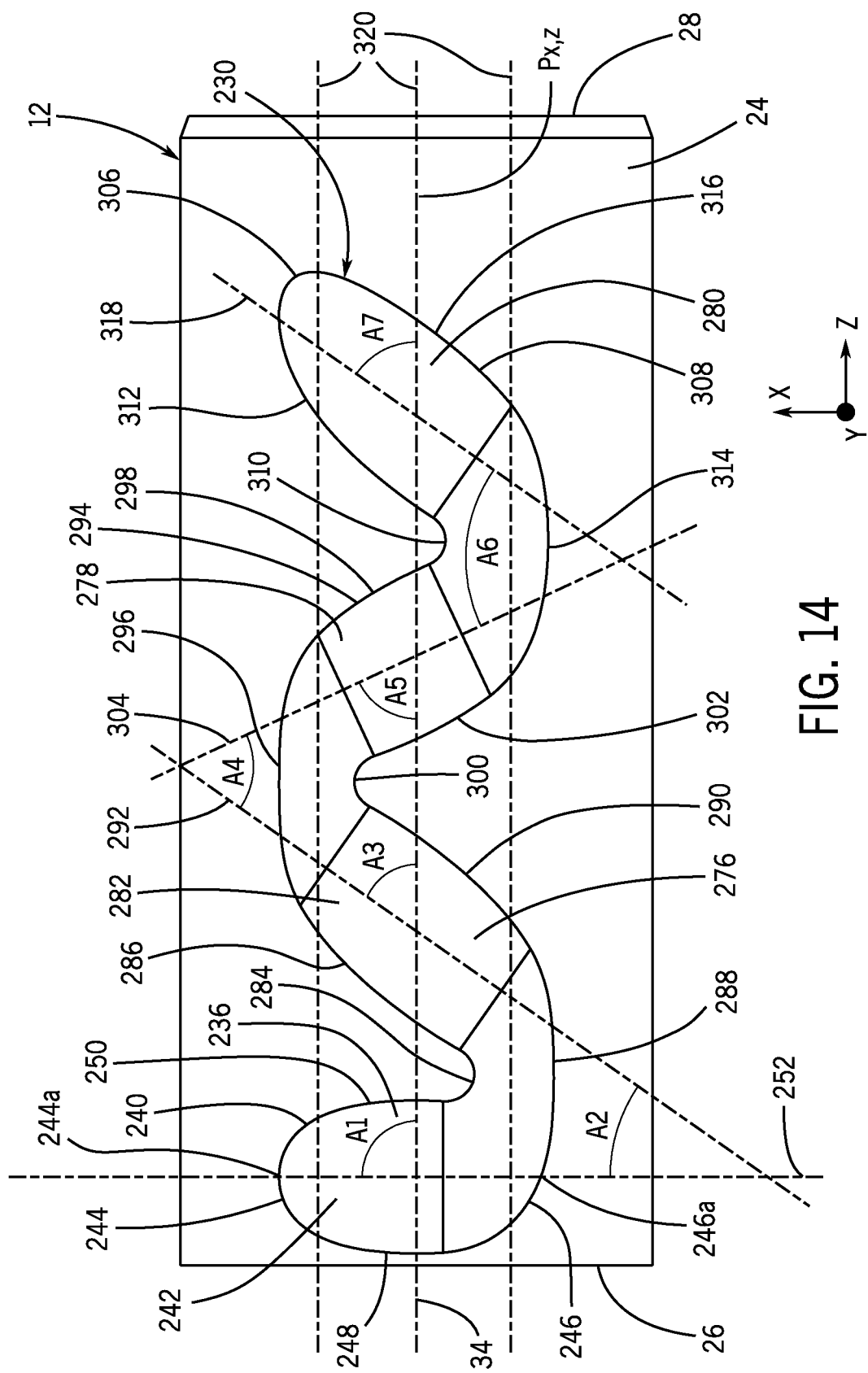
FIG. 14 is a plan view of the bearing pin of FIG. 13.
Figure 16:
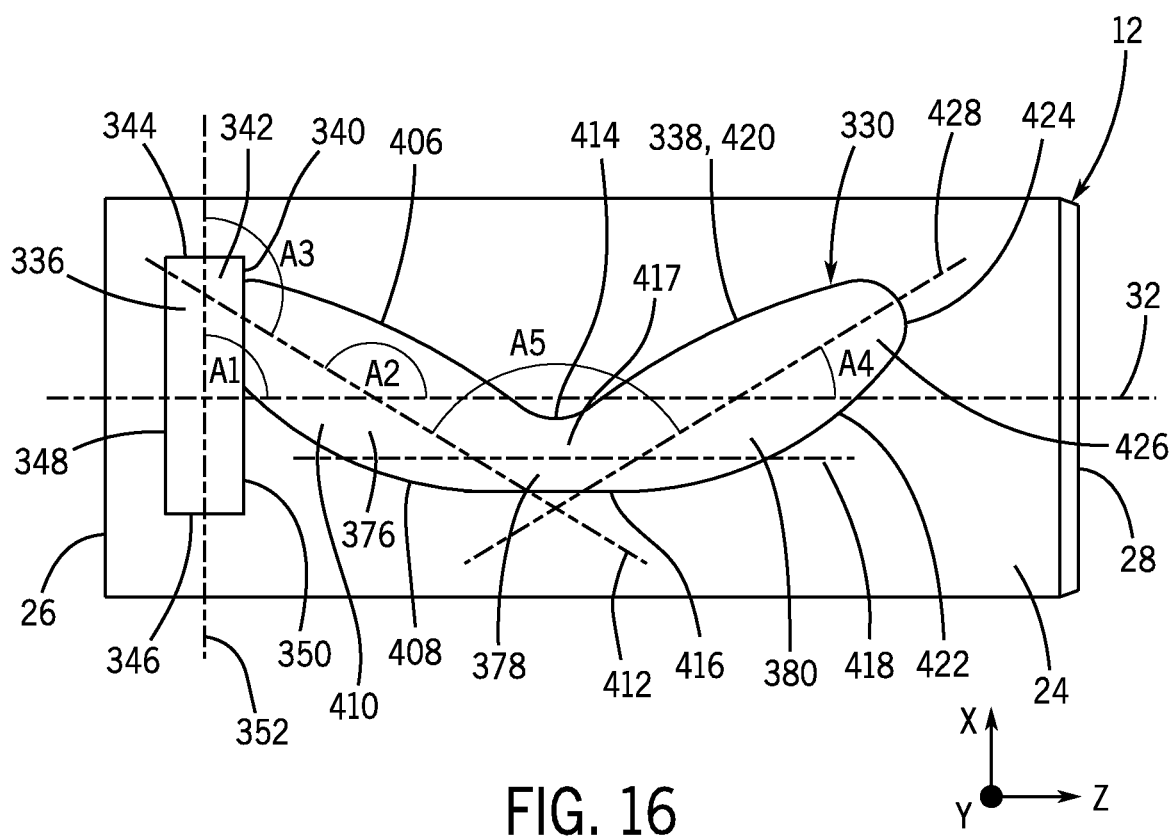
FIG. 16 is a plan view of the bearing pin shown cut with yet another alternate lubrication channel.

The bearing pin 12 has a cylindrical pin body 24 having opposite proximal and distal ends 26, 28, and a lubrication channel 30, 130, 230, 330 disposed in the pin body 24. The lubrication channel 30, 130, 230, 330 is open to an outer surface 32 of the pin body 24 which is defined by the circumference of the pin body 24. A pin axis 34 is defined between the ends 26, 28. The bearing pin 12 defines x, y and z axes as shown in FIG. 3. The pin axis 34 falls along the z-axis and is positioned within the x-z plane (plane Px,z) which defines a horizontal plane and is positioned within the y-z plane (plane Py,z) which defines a vertical plane. The cylindrical outer surface 32 of the pin body 24 and the lubrication channel 30, 130, 230, 330 define an outer periphery of the bearing pin 12 extending between the ends 26, 28, such that the outer periphery is partially defined by the circumference of the pin body 24 and partially defined by the lubrication channel 30, 130, 230, 330. A first example embodiment of the lubrication channel 30 is shown in FIGS. 2-7. A second example embodiment of the lubrication channel 130 is shown in FIGS. 9B-11A. A third example embodiment of the lubrication channel 230 is shown in FIGS. 13-15. A fourth example embodiment of the lubrication channel 330 is shown in FIG. 16. The geometry of the lubrication channel 30, 130, 230, 330 allows for a centerless grinding operation to remove any material which is proud of the lubrication channel 30, 130, 230, 330 after milling of the lubrication channel 30, 130, 230, 330.

As shown in the first example embodiment of FIGS. 2-7, the lubrication channel 30 is generally L-shaped. The lubrication channel 30 has a first groove 36 which is open to the outer circumference of the pin body 24, and a second groove 38 which is open to the outer circumference of the pin body 24 and which intersects the first groove 36. The grooves 36, 38 form a continuous pathway such that oil can flow from the first groove 36 into the second groove 38 and is entrained therein.

Figure 4:
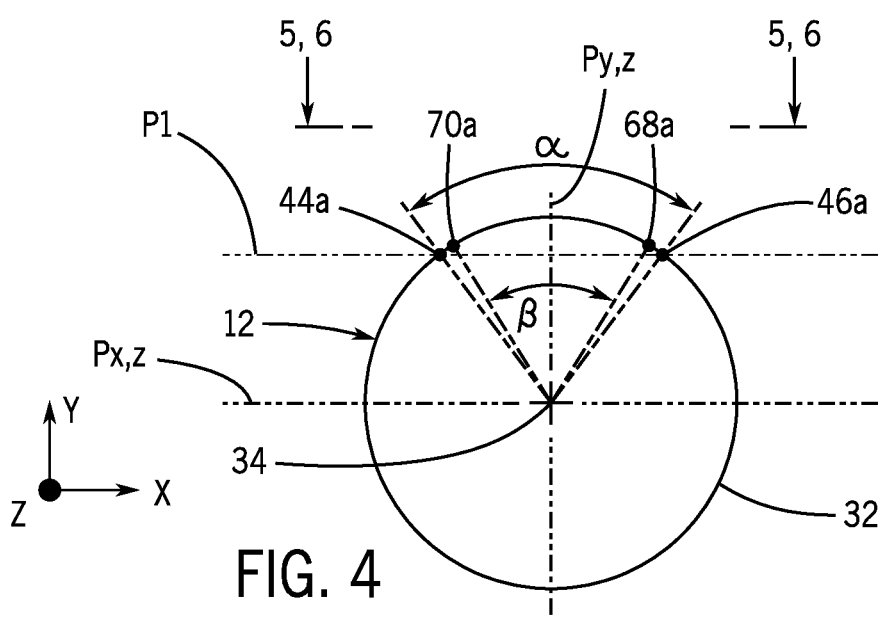
FIG. 4 is an end view of a proximal end of the bearing pin.

The first groove 36 extends across a first convex section of the outer surface 32, and is defined by an edge 40 and a recessed bottom surface 42 extending inwardly from the edge 40 toward the pin axis 34. The edge 40 does not intersect the ends 26, 28 of the pin body 24. The edge 40 is defined by opposite first and second edge sections 44, 46 which are connected together by a proximal edge section 48 which is proximate to, but spaced from, the proximal end 26 of the pin body 24, and a distal edge section 50 that extends from the first edge section 44 to the second groove 38. The first groove 36 is open to the outer circumference of the bearing pin 12, and the first edge section 44 defines a first circumferential open end thereof and the second edge section 46 defines a second circumferential open end thereof. A width of the first groove 36 is defined between the proximal and distal edge sections 48, 50, and a length of the first groove 36 is defined between the first and second edge sections 44, 46. A centerline 52 of the first groove 36 is defined through a midpoint 44a of the first edge section 44 and a midpoint 46a of the second edge section 46. The centerline 52 is straight, lies in a horizontal plane P1 which is parallel to the plane Px,z, and is angled at an angle A1 relative to the plane Py,z. The angle A1 may be 90 degrees such that the centerline 52 is, in effect, perpendicular to the pin axis 34 and lies in the plane Px,y. When the first groove 36 is viewed in a plan view like that shown in FIG. 5, each first and second edge section 44, 46 forms an arc, and each is generally perpendicular to the centerline 52. When the first groove 36 is viewed in a plan view like that shown in FIG. 5, each proximal and distal edge section 48, 50 forms an elongated arc, and each is generally parallel to the centerline 52. The recessed bottom surface 42 has a concave sectional profile along all points perpendicular to the centerline 52 as shown by the sectional profile cuts in FIGS. 5A-5C. In the embodiment as shown, the concave sectional profile of the recessed bottom surface 42 at each point is an arc having a constant radius r which is defined by a rotational axis 54 of a tool T that can be used to cut the first groove 36. In an embodiment, the rotational axis 54 of the tool T is parallel to the plane P1. FIGS. 5A-5C and 5F show that the recessed bottom surface 42 of the first groove 36 has a consistent depth d1, between the plane P1 in which the centerline 52 is formed and the plane Px,z along the length of the first groove 36. FIGS. 5A-5D and 6F show depths d2 of the recessed bottom surface 42 relative to the plane Px,z, cut across the length of the first groove 36. Depth d2 is greater than depth d1. The midpoint 44a, 46a of each edge section 44, 46 is positioned at an angle α relative to each other which is less than 90 degrees apart when measured radially as shown in FIG. 4. In an embodiment, the first groove 36 is formed such that a cylindrical rod can be set therewithin along the first convex section, with the rotational axis of the cylindrical rod being parallel to the centerline 52.

The second groove 38 extends across a second convex section of the outer surface 32, and is defined by an edge 60 and a recessed bottom surface 62 extending inwardly from the edge 60 toward the pin axis 34. The edge 60 does not intersect the ends 26, 28 of the pin body 24. The edge 60 is defined by opposite first and second edge sections 64, 66 which are connected together by a proximal end 68 which intersects the distal edge section 50 of the first groove 36 proximate to the second edge section 46, and a distal edge section 70 that extends from the first edge section 64 to the second edge section 66 and is proximate to, but spaced from, the distal end 28 of the pin body 24. The second groove 38 is open to the outer circumference of the bearing pin 12, and the proximal end 68 defines a first circumferential open end thereof and the distal edge section 70 defines a second circumferential open end thereof. A width of the second groove 38 is defined between the first and second edge sections 64, 66, and a length of the second groove 38 is defined between the proximal end 68 and the distal edge section 70. A centerline 72 of the second groove 38 is defined through a midpoint 68a of the proximal end 68 and a midpoint 70a of the distal edge section 70. The centerline 72 is straight, lies in the horizontal plane P1 and is at an angle A2 relative to the plane Py,z. A midpoint of the centerline 72 crosses the plane Py,z. The angle A2 is between 0 degrees and 90 degrees. In an embodiment, the angle A2 is 45 degrees. The first and second edge sections 64, 66 form an elongated arc when viewed in a plan view, and are generally parallel to the centerline 72. The distal edge section 70 forms an arc when viewed in a plan view, and is generally perpendicular to the centerline 72. The recessed bottom surface 62 has a concave sectional profile along all points perpendicular to the centerline 72 as shown by the sectional profile cuts in FIGS. 6A-6D. In the embodiment as shown, the concave sectional profile of the recessed bottom surface 62 at each point is an arc having a constant radius r which is defined by the rotational axis 54 of the tool T which may be used to cut the second groove 38. FIGS. 6A-6C show that the recessed bottom surface 62 of the second groove 38 has the same depth d1, between the plane P1 in which the centerline 72 is formed and the plane Px,z along the length of the second groove 38. FIG. 6B shows depths d2 of the recessed bottom surface 62 relative to the plane Px,z, cut across the length of the second groove 38. Depth d2 is greater than depth d1. The midpoint 68a of the proximal end 68 and the midpoint 70a of the edge section 70 are positioned at an angle β relative to each other which is less than 90 degrees apart from each other when measured radially as shown in FIG. 4. In an embodiment, the second groove 38 is formed such that the cylindrical rod can be set therewithin along the second convex section.

Figure 7:
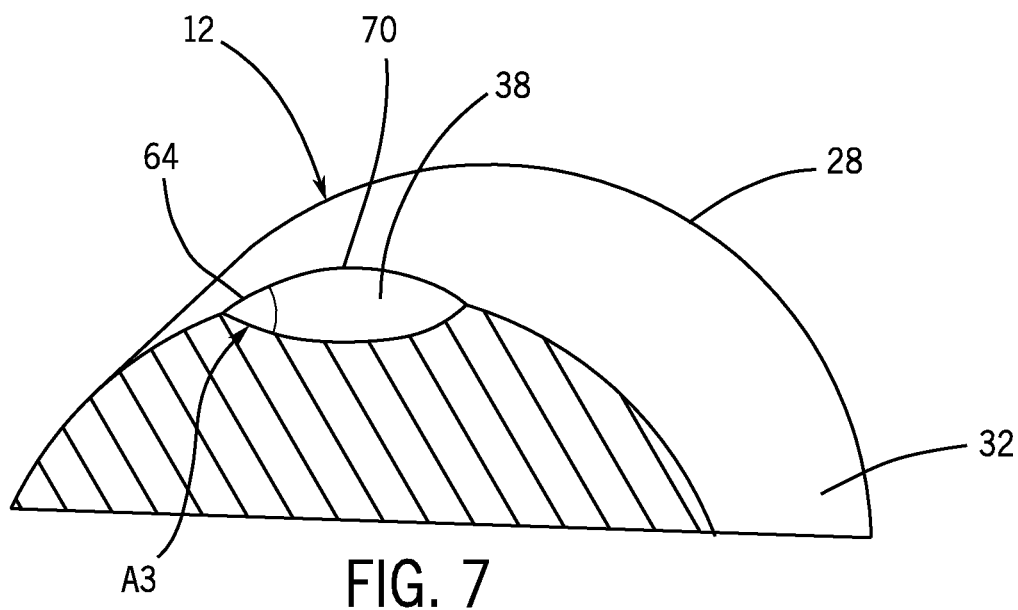
FIG. 7 is a perspective cross-sectional view along line 7-7 of FIG. 6.

As shown in FIG. 7, the recessed bottom surface 62 forms a shallow angle A3 between the outer surface 32 and the wall forming the recessed bottom surface 62. This same angle A3 is provided for the recessed bottom surface 42. This shallow angle causes oil within the first and second grooves 36, 38 to be entrained therewithin.

Figure 5:
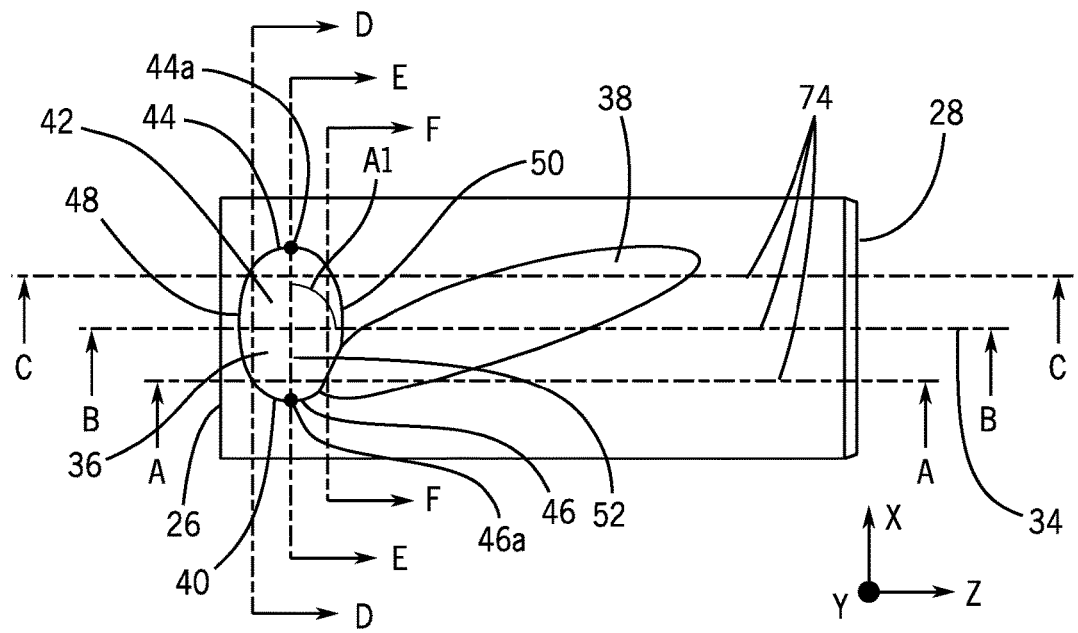
FIG. 5 is a plan view of the bearing pin.
Figures 5A, 5B, 5C:
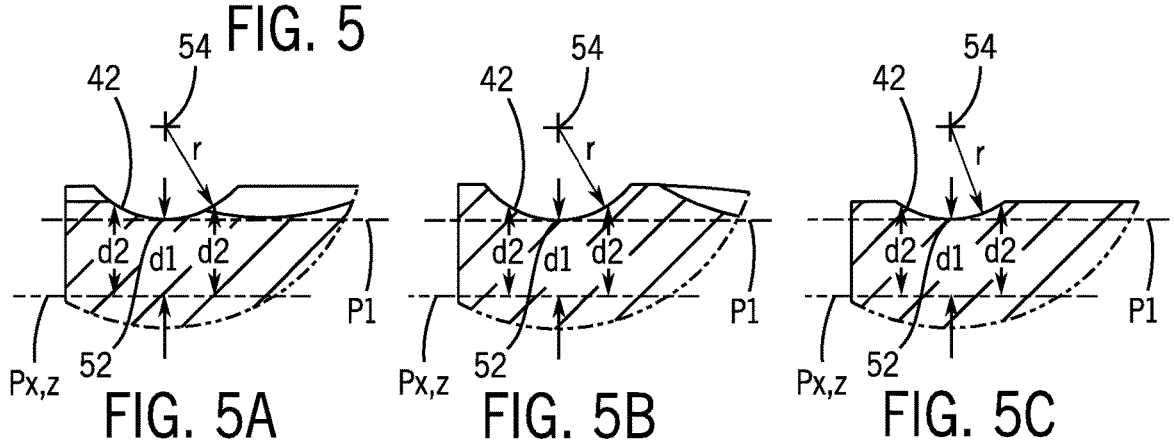
FIGS. 5A-5F are cross-sectional views along lines A-A, B-B, C-C, D-D, E-E, and F-F, respectively of FIG. 5.
Figures 5D, 5E, 5F:
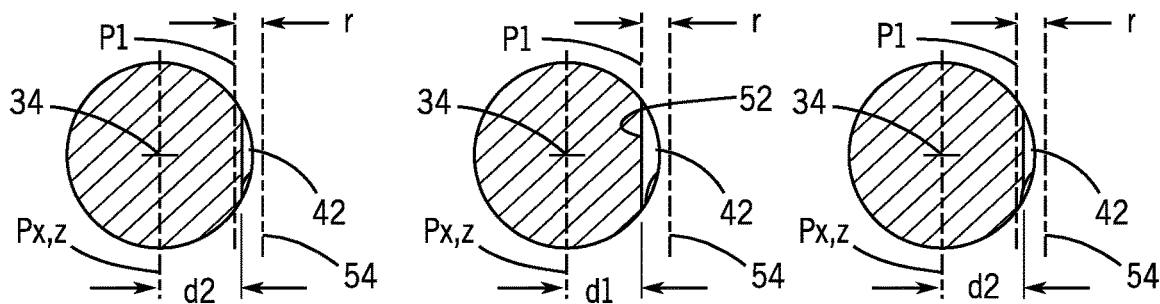

Lines of contact 74, which are defined by lines parallel to the pin axis 34, are shown in FIG. 5. In an embodiment, the length, width and orientation of each groove 36, 38 are defined such that amount of surface area of the lubrication channel 30 along each line of contact 74 does not exceed 50 percent of the surface area of the bearing pin 12 along each line of contact 74.

Figure 8:
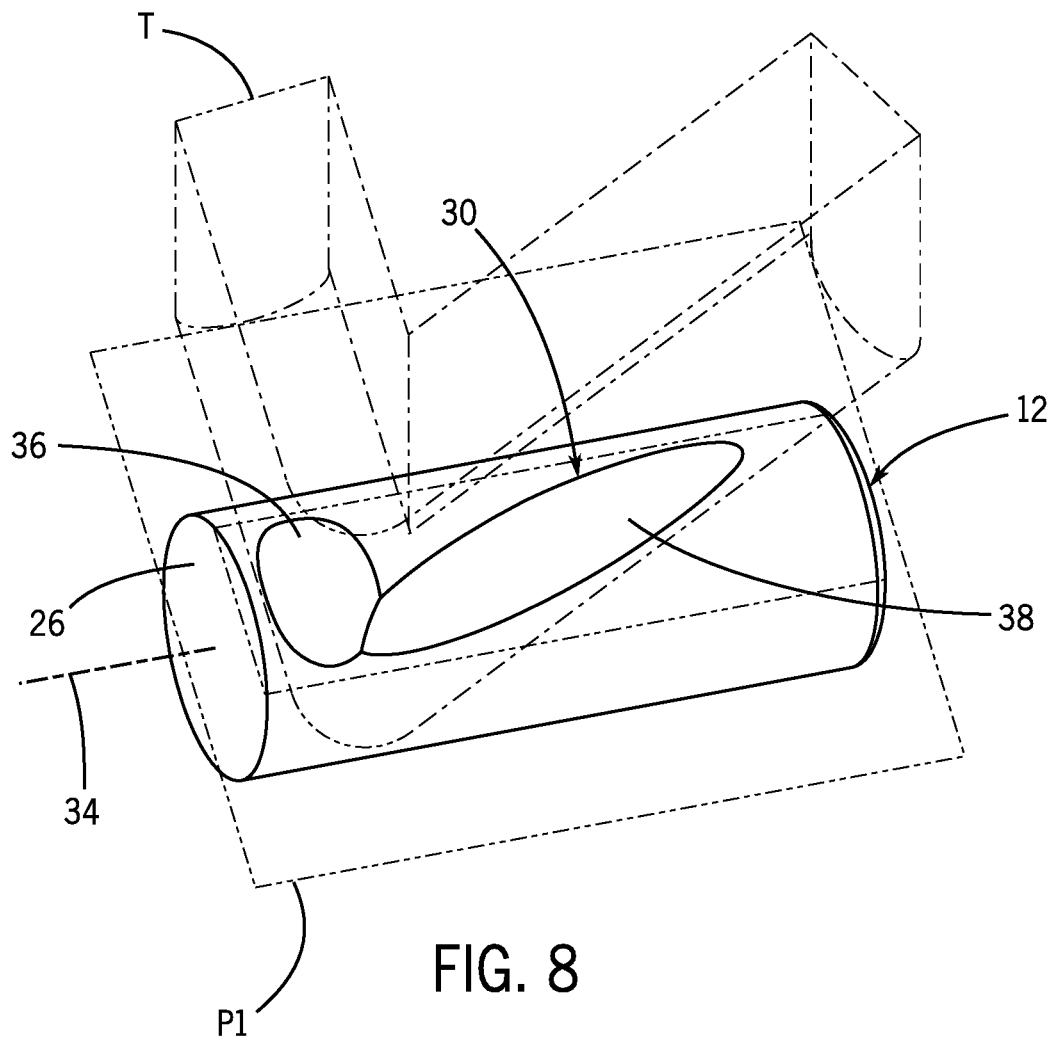
FIG. 8 is an isometric view of the bearing pin shown with an alternate cutting tool in phantom lines.

To form the first embodiment, the rotational orientation of the bearing pin 12 is fixed, and the outer surface 32 of the bearing pin 12 is cut in a first straight line across the first convex section using a tool to create the first groove 36. Thereafter, the outer periphery of the bearing pin 12 is cut in a second straight line across the second convex section to create the second groove 38. The bearing pin 12 is not rotated relative to the tool; instead, the tool is rotated relative to the bearing pin 12. For example, as shown in FIGS. 3 and 8, the cutting is performed with a cutting tool T having a convex cutting profile. An example of such a cutting tool T may be a larger carbide insert tool on edge as shown in FIG. 3, or may be a ball mill tool as shown in FIG. 8. The same cylindrical profile of the tool T is engaged with the outer surface 32 to form the first and second grooves 36, 38. The rotational axis 54 of the cutting tool T is effectively perpendicular to the pin axis 34 when the first groove 36 is cut, and the rotational axis 54 of the cutting tool T is effectively at an angle relative to the pin axis 34 when the second groove 38 is cut. The rotational axis 54 of the tool T is at the same radial distance r when both grooves 36, 38 are cut, such that the centerlines 52, 72 of the grooves 36, 38 are cut in the same horizontal plane P1. This cutting path allows the cutting tool T to pass fully clear of the bearing pin 12 when forming the first groove 36, and does not depend on a corner of the cutting tool T to form the proximal and distal edge sections 48, 50 and the edge sections 64, 66. Since the grooves 36, 38 have the same radius, the same cutting tool T can be used cut both grooves 36, 38. The cylindrical cuts provide a tool path that does not need to be computerized, and coordinate measuring machine (CMM) measurement of the outer periphery is simplified. As such, the lubrication channel 30 can be cut with standard tools, such as a #7 shaped tool path by a ball mill tool, or by two separate straight cuts with either a ball mill tool or a larger diameter tool. As an example, a horizontal mill with a rotary table can be used to make the two grooves 36, 38 in two passes of the same large diameter tool T with radius tips. The uncut bearing pin 12 sits in a v-block on top of the rotary table. First, one pass is completed to form one of the grooves for example groove 36, the rotary table is indexed, and a second pass is completed to form the other groove for example groove 38. In this example, each movement can happen individually such as by hand, without the need for computer numerical control (CNC) to coordinate two degrees of freedom at the same time. When a ball mill tool or a larger carbide insert tool on edge is used to form the cuts, a sharp edge is not formed which provides for the shallow angle A3 for entrainment of the oil in the lubrication channel 30. As such, use of a cylindrical endmill is not desirable since a cylindrical endmill cannot create the shallow angle A3. If a cylindrical endmill were used, some areas would be sharp and would not entrain oil. While this method of forming the lubrication channel 30 is described as first cutting the groove 36 first and cutting the groove 38 second, the groove 38 cab be cut first and the groove 36 can be cut second.

As shown in the second example embodiment of FIGS. 9B-12, the lubrication channel 130 is generally L-shaped. The lubrication channel 130 has a first groove 136 which is open to the outer circumference of the pin body 24, and a second groove 138 which is open to the outer circumference of the pin body 24 and which intersects the first groove 136. The grooves 136, 138 form a continuous pathway such that oil can flow from the first groove 136 into the second groove 138 and is entrained therein.

The first groove 136 extends across a first convex section of the outer surface 32, and is identically formed to the first groove 36, except for the difference noted herein. Like reference numerals are used to denote like elements. The first groove 136 may be formed in a like manner to that described for the first embodiment. The second groove 138 extends across a second convex section of the outer surface 32, and is identically formed to the second groove 138, except for the difference noted herein. Like reference numerals are used to denote like elements. The proximal end 68 of the second groove 138 intersects the distal edge section 50 proximate to the first edge section 44. The centerline 72 of the second groove 138 is not in the same plane as the plane P1 in which the centerline 52 of the first groove 136 is provided. Instead, the centerline 72 of the second groove 138 is a second plane P2 which is offset at an angle A1 relative to the plane P1. In addition, the centerline 72 is radially offset from the plane Py,z to one side thereof.

Figure 9A:
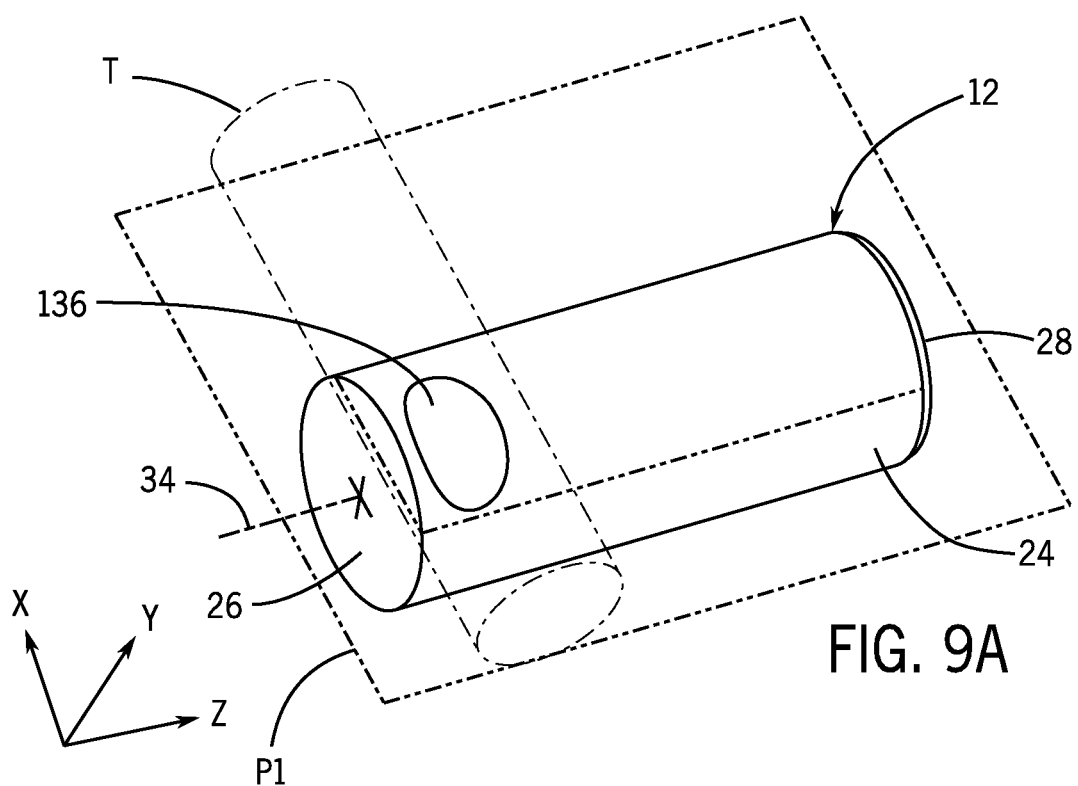
FIGS. 9A and 9B are isometric views of the bearing pin shown being cut with an alternate lubrication channel and showing a cutting tool in phantom lines.
Figure 9B:
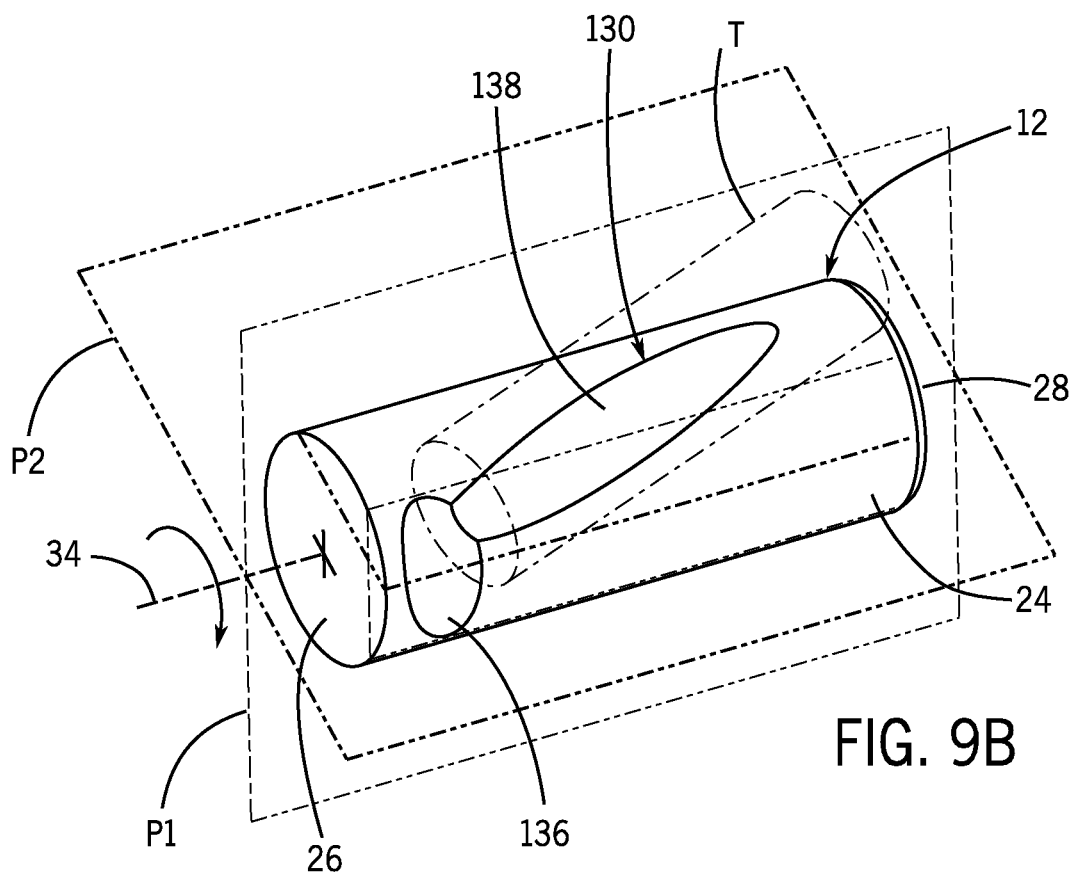
Figure 12:
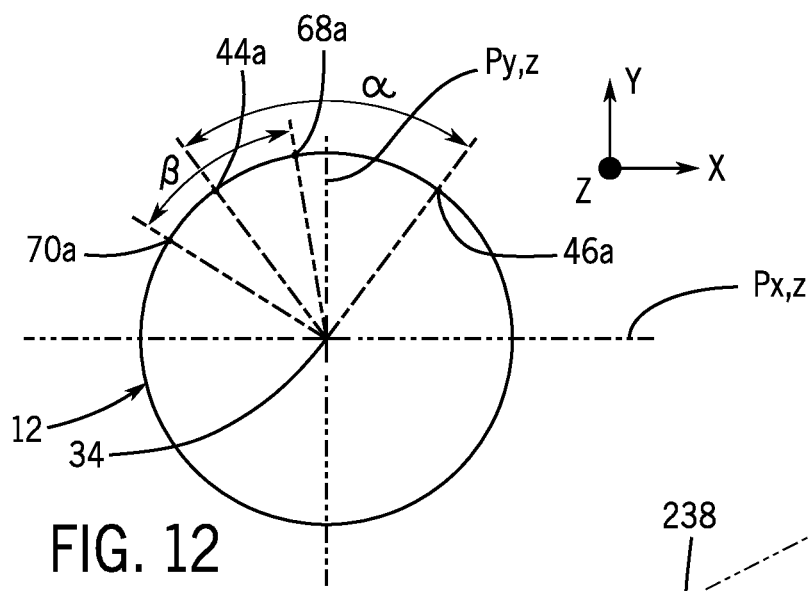
FIG. 12 is an end view of a proximal end of the bearing pin of FIG. 9B.

To form the second embodiment, the rotational orientation of the bearing pin 12 is fixed, and the outer surface 32 of the bearing pin 12 is cut in a first straight line across the first convex section using a tool to create the first groove 36, see FIG. 9A. Thereafter, bearing pin 12 is rotated relative to the tool, the rotational orientation of the bearing pin 12 is thereafter fixed, and the outer periphery of the bearing pin 12 is cut in a second straight line across the second convex section to create the second groove 38, see FIG. 9B. The cutting may be performed with the same cutting tool T described for the first embodiment. The rotational axis 54 of the cutting tool T is effectively perpendicular to the pin axis 34 when the first groove 36 is cut, and the rotational axis 54 of the cutting tool T is effectively at an angle relative to the pin axis 34 when the second groove 38 is cut. The rotational axis 54 of the tool T is at the same radial distance r when both grooves 36, 38 are cut. Since the grooves 36, 38 have the same radius, the same cutting tool T can be used cut both grooves 36, 38. While this method of forming the lubrication channel 130 is described as first cutting the groove 36 first and cutting the groove 38 second, the groove 38 cab be cut first and the groove 36 can be cut second.

Lines of contact are defined by lines parallel to the pin axis 34. In an embodiment, the length, width and orientation of each groove 136, 138 are defined such that amount of surface area of the lubrication channel 130 along each line of contact does not exceed 50 percent of the surface area of the bearing pin 12 along each line of contact.

As shown in the third example embodiment of FIGS. 13-15, the lubrication channel 230 is provided along a winding line generally in the shape of a W, such that the lubrication channel 230 is generally serpentine. The lubrication channel 230 includes a first groove 236 which is open to the outer circumference of the pin body 24, and further includes a second groove 238 which is open to the outer circumference of the pin body 24 and which is formed of first, second and third groove segments 276, 278, 280. The second groove segment 278 generally mirrors the first groove segment 276, and the third groove segment 280 generally mirrors the second groove segment 278. The grooves 236, 238 form a continuous pathway such that oil can flow from the first groove 236 into the second groove 238 and is entrained therein.

The first groove 236 extends across a first convex section of the outer surface 32, and is defined by an edge 240 and a recessed bottom surface 242 extending inwardly from the edge 240 toward the pin axis 234. The edge 240 does not intersect the ends 26, 28 of the pin body 24. The edge 240 is defined by opposite first and second edge sections 244, 246 which are connected together by a proximal edge section 248 which is proximate to, but spaced from, the proximal end 26 of the pin body 24, and a distal edge section 250 that extends from the first edge section 244 to the second groove 238. The first groove 236 is open to the outer circumference of the bearing pin 12, and the first edge section 244 defines a first circumferential open end thereof and the second edge section 246 defines a second circumferential open end thereof. A width of the first groove 236 is defined between the proximal and distal edge sections 248, 250, and a length of the first groove 236 is defined between the first and second edge sections 244, 246. A centerline 252 of the first groove 236 is defined through a midpoint 244a, 246a of each edge section 244, 246. The centerline 252 is straight, lies in a horizontal plane P1 which is parallel to the plane Px,z, and is angled at an angle A1 relative to the plane Py,z extending through the pin axis 34. The angle A1 may be 90 degrees such that the centerline 252 is, in effect, perpendicular to the pin axis 34 and lies in the plane Px,y. Each edge section 244, 246 forms an arc when viewed in a plan view, and each is generally perpendicular to the centerline 252. Each edge section 248, 250 forms an elongated arc when viewed in a plan view, and each is generally parallel to the centerline 252. The recessed bottom surface 242 has a concave sectional profile along all points perpendicular to the centerline 252. The midpoint 244a, 246a of each edge section 244, 246 is positioned at an angle α relative to each other which is less than 90 degrees apart when measured radially.

The first groove segment 276 extends across a second convex section of the outer surface 32. When viewed in a plan view as shown in FIG. 14, the first groove segment 276 has a first edge that extends from the edge section 250, a second edge that extends from the edge section 246, and a recessed bottom surface 282 extending inwardly therebetween toward the pin axis 34. The first edge has a first edge section 284 which is curved and extends from the edge section 250, and a second edge section 286 which extends from a distal end of the first edge section 284. The second edge has a first edge section 288 which extends from the edge section 246 and is generally parallel to the plane Py,z, and a second edge section 290 which extends from a distal end of the first edge section 288. A centerline 292 of the first groove segment 276 is defined between the second edge sections 286, 290. The centerline 292 is straight, lies in the horizontal plane P1, is at an angle A2 relative to the centerline 252 and at an angle A3 relative to the plane Py,z. The angle A2 is between 0 degrees and 90 degrees. In an embodiment, the angle A2 is 45 degrees. The angle A3 is between 0 degrees and 90 degrees. In an embodiment, the angle A3 is 45 degrees. The second edge sections 286, 290 form elongated arcs when viewed in a plan view, and are generally parallel to the centerline 292. Opposite ends of the first groove segment 276 are positioned at an angle relative to each other which is less than 90 degrees apart from each other when measured radially.

The second groove segment 278 extends across a third convex section of the outer surface 32. When viewed in a plan view as shown in FIG. 14, the second groove segment 278 has a first edge that extends from the distal end of the second edge section 286, a second edge that extends from the distal end of the second edge section 290, and a recessed bottom surface 294 extending inwardly therebetween toward the pin axis 34. The first edge has first edge section 296 which extends from the distal end of the second edge section 286 and is generally parallel to the plane Py,z, and a second edge section 298 which extends from the distal end of the first edge section 296. The second edge has first edge section 300 which extends from the distal end of the second edge section 290 and which is curved, and a second edge section 302 which extends from the distal end of the first edge section 300. A centerline 304 of the second groove segment 278 is defined between the second edge sections 298, 302. The centerline 304 is straight, lies in the horizontal plane P1, is at an angle A4 relative to the centerline 292, and is at an angle A5 relative to the plane Py,z. The angle A4 is between 0 degrees and 90 degrees, and the angle A5 is between 0 degrees and 90 degrees. In an embodiment, the angles A4 and A5 are 45 degrees. The second edge sections 298, 302 form elongated arcs when viewed in a plan view, and are generally parallel to the centerline 304. Opposite ends of the second groove segment 278 are positioned at an angle relative to each other which is less than 90 degrees apart from each other when measured radially.

The third groove segment 280 extends across a fourth convex section of the outer surface 32. When viewed in a plan view as shown in FIG. 14, the third groove segment 280 has a first edge that extends from the second edge section 298, a second edge that extends from the second edge section 302, a distal edge section 306 extending between distal ends of the first and second edges, and a recessed bottom surface 308 extending inwardly therebetween toward the pin axis 34. The first edge has first edge section 310 which is curved and extends from the distal end of the second edge section 298, and a second edge section 312 which extends from the distal end of the first edge section 310. The second edge has first edge section 314 which extends from the distal end of the second edge section 302 and is generally parallel to the pin axis 34, and a second edge section 316 which extends from the distal end of the first edge section 314. A centerline 318 of the third groove segment 280 is defined between the second edge sections 312, 316 and intersects the distal edge section 306. The centerline 318 is straight, lies in the horizontal plane P1, is at an angle A6 relative to the centerline 304, and at an angle A7 relative to the plane Py,z. The angle A6 is between 0 degrees and 90 degrees, and the angle A7 is between 0 degrees and 90 degrees. In an embodiment, the angles A6 and A7 are 45 degrees. The second edge sections 312, 316 form elongated arcs when viewed in a plan view, and are generally parallel to the centerline 318. The distal edge section 306 forms an arc. Opposite ends of the third groove segment 280 are positioned at an angle relative to each other which is less than 90 degrees apart from each other when measured radially.

Opposite ends of each groove segment 276, 278, 280 are open to the outer circumference of the bearing pin 12, and define first and second opposite circumferential open ends of each groove segment 276, 278, 280. The first edge section 244, the first edge section 296, and the distal edge section 306 align longitudinally along the length of bearing pin 12. The second edge section 246 and the first edge sections 288, 314 align longitudinally along the length of bearing pin 12. In the embodiment as shown, the concave sectional profile of each recessed bottom surface 242, 282, 294, 308 at each point is an arc having a constant radius. The centerlines 252, 292, 304, 318 are spaced at the same distance from the plane Px,z. Each centerline 252, 292, 304, 318 crosses the plane Py,z and may cross at the midpoint thereof.

Lines of contact 320, which are defined by lines parallel to the pin axis 34, are shown in FIG. 14. In an embodiment, the length, width and orientation of each groove 236, 238 are defined such that amount of surface area of the lubrication channel 230 along each line of contact 320 does not exceed 50 percent of the surface area of the bearing pin 12 along each line of contact 320.

To form the third embodiment, the rotational orientation of the bearing pin 12 is fixed, and a ball endmill tool having a convex cutting profile is continuously engaged with the outer surface 32 to create the first and second grooves 236, 238. The bearing pin 12 is not rotated relative to the tool; instead, the tool is moved relative to the bearing pin 12. The centerlines 252, 292, 304, 318 are cut in the same horizontal plane P1. Since a ball endmill tool is used to form the grooves 236, 238, a sharp edge is not provided which provides for shallow angles at the ends for entrainment of the oil in the lubrication channel 230.

As shown in the fourth example embodiment of FIG. 16, the lubrication channel 330 is provided along a winding line. The lubrication channel 330 includes a first groove 336 which is open to the outer circumference of the pin body 24, and further includes a second groove 338 which is open to the outer circumference of the pin body 24 and which intersects the first groove 336. The second groove 338 is formed of first, second and third groove segments 376, 378, 380. The groove segments 376, 378, 380 generally form a V-shape. The grooves 336, 338 form a continuous pathway such that oil can flow from the first groove 336 into the second groove 338.

The first groove 336 extends across a first convex section of the outer surface 32, and is defined by an edge 340 and a recessed bottom surface 342 extending inwardly from the edge 340 toward the pin axis 34. The edge 340 does not intersect the ends 26, 28 of the pin body 24. The edge 340 is defined by opposite first and second edge sections 344, 346 which are connected together by a proximal edge section 348 which is proximate to, but spaced from, the proximal end 26 of the pin body 24, and a distal edge section 350 that extends between the first and second edge sections 344, 346, but is interrupted by the second groove 338. The first groove 336 is open to the outer surface 32 of the bearing pin 12, and the first edge section 344 defines a first circumferential open end thereof and the second edge section 346 defines a second circumferential open end thereof. A width of the first groove 336 is defined between the proximal and distal edge sections 348, 350, and a length of the first groove 336 is defined between the edge sections 344, 346. A centerline 352 of the first groove 336 is defined through a midpoint of each edge section 344, 346. The centerline 352 is straight, lies in a horizontal plane which is parallel to the plane Px,z, and is angled at an angle A1 relative to the plane Py,z. The angle A1 may be 90 degrees such that the centerline 352 is, in effect, perpendicular to the pin axis 34 and lies in the plane Px,y. Each edge section 344, 346 forms a line when viewed in a plan view as shown in FIG. 16, and each is generally perpendicular to the centerline 352. Each edge section 348, 350 forms a line when viewed in a plan view as shown in FIG. 16, and each is generally parallel to the centerline 352. The recessed bottom surface 342 may have a square sectional profile along all points perpendicular to the centerline 352. Each edge section 344, 346 is positioned at an angle relative to each other which is less than 90 degrees apart when measured radially. Alternatively, the first groove 336 may be formed like that of the other embodiments.

The first groove segment 376 extends across a second convex section of the outer surface 32. When viewed in a plan view as shown in FIG. 16, the first groove segment 376 has a first edge section 406 that extends from the distal edge section 350, a second edge section 408 that extends from the distal edge section 350, and a recessed bottom surface 410 extending inwardly therebetween toward the pin axis 34. A centerline 412 of the first groove segment 376 is defined between the edge sections 406, 408. The centerline 412 is straight, lies in the horizontal plane P1, is at an angle A2 relative to the plane Py,z, and is at an angle A3 relative to the centerline 352. The angle A2 is between 90 degrees and 180 degrees, and the angle A3 is between 90 degrees and 180 degrees. The edge sections 406, 408 form elongated arcs when viewed in a plan view, and are generally parallel to the centerline 412. The recessed bottom surface 410 has a concave sectional profile along all points perpendicular to the centerline 412. Opposite ends of the first groove segment 376 are positioned at an angle relative to each other which is less than 90 degrees apart from each other when measured radially.

The second groove segment 378 distal has a first edge section 414 which is curved and extends from the distal end of the first edge section 406, and a second edge section 416 which extends from the distal end of the second edge section 408 and is generally parallel to plane Py,z, and a recessed bottom surface 409 extending inwardly therebetween toward the pin axis 34. A centerline 418 is defined between the edge sections 414, 416 which is parallel to the plane Py,z. The centerline 418 is offset to one side of the plane Py,z.

The third groove segment 380 extends across a third convex section of the outer surface 32. The third groove segment 380 has a first edge section 420 that extends from the distal end of the first edge section 414, a second edge section 422 that extends from the distal end of the second edge section 416, a distal end edge section 424 extending between distal ends of the edge sections 420, 422, and a recessed bottom surface 426 extending inwardly therebetween toward the pin axis 34. A centerline 428 of the third groove segment 380 is defined between the edge sections 420, 422 and intersects the distal end edge section 424. The centerline 428 is straight, lies in the horizontal plane P1, is at an angle A4 relative to the plane Py,z, and is at an angle A5 relative to the centerline 412. The angle A4 is between 0 degrees and 90 degrees, and the angle A5 is between 0 degrees and 90 degrees. The edge sections 420, 422 form elongated arcs when viewed in a plan view, and are generally parallel to the centerline 428. The recessed bottom surface 426 has a concave sectional profile along all points perpendicular to the centerline 428. Opposite ends of the third groove segment 380 are positioned at an angle relative to each other which is less than 90 degrees apart from each other when measured radially.

Opposite ends of each groove segment 376, 378, 380 are open to the outer circumference of the bearing pin 12, and define first and second opposite circumferential open ends of each groove segment 376, 378, 380. In the embodiment as shown, the concave sectional profile of each recessed bottom surface 410, 426 at each point is an arc having a constant radius. The centerlines 352, 412, 418, 428 are spaced at the same distance from the plane Px,z. Each centerline 352, 412, 428 crosses the plane Py,z and may cross at the midpoint thereof.

To form the fourth embodiment, the rotational orientation of the bearing pin 12 is fixed, and an interpolated ball mill tool is engaged with the outer surface 32 to create the first and second grooves 236, 238. The bearing pin 12 is not rotated relative to the tool; instead, the tool is moved relative to the bearing pin 12. The centerlines 352, 412, 418, 428 are cut in the same horizontal plane P1.

Lines of contact are defined by lines parallel to the pin axis 34. In an embodiment, the length, width and orientation of each groove 336, 338 are defined such that amount of surface area of the lubrication channel 330 along each line of contact does not exceed 50 percent of the surface area of the bearing pin 12 along each line of contact.

It has been found that when the lubrication channel extends the full length of the pin body, an unacceptable loss of contact is created between centerless grinding rollers when a flat area which is formed by the full length lubrication channel contacts that pressure roller of the centerless grinding rollers. Because the lubrication channels 30, 130, 230, 330 of the present disclosure do not extend the full length of the pin body 24, the pin body 24 can be subjected to a centerless grinding operation after formation of the lubrication channel 30, 130, 230, 330 without the loss of contact between the wheels used in the centerless grinding operation. As shown, for example, by the lines of contact 74, 320 in FIGS. 5 and 14, there is a high percentage of contact over along every line of contact 74, 320 around the perimeter of the bearing pin 12. In some embodiments, each line of contact 74, 320 contact has at least 50% of the length of the outer surface 32 still in contact with the each of the rollers during grinding. As a result, the bearing pin 12 does not provide an area where the pressure applied by the regulating wheel is completely interrupted.

The roller 20 has opposite ends 500, 502 and a cylindrical outer periphery defined by its outer circumference between the ends 500, 502. A cylindrical central passageway 504 which is defined an inner wall extends between the ends 500, 502.

Each forked arm 14, 16 has an opening 506, 508 therethrough and which are aligned with each other, and which is in communication with the opening 22. Opposite end portions of the bearing pin 12 extend into the openings 506, 508 and are fixed to the arms 14, 16 such that the bearing pin 12 extends across the opening 22. The roller 20 seats on the portion of the bearing pin 12 extending between the arms 14, 16 such that the bearing pin 12 is within the passageways 504, and the ends of the roller 20 are proximate to the arms 14, 16. One of the arms 14, 16, shown as arm 14, has a channel 570 which extends therethrough and has an end that is aligned with the first groove 36, 136, 236, 336. The channel 570 provides a passageway for oil to flow from a source, through the channel 570, into the first groove 36, 136, 236, 336, and then into the second groove 38, 138, 238, 338, 438. During use, the oil is introduced into the first groove 36, 136, 236, 336 from the channel 570. In an embodiment, the oil is introduced into a center portion of the first groove 36, 136, 236, 336. The oil then flows along the first groove 36, 136, 236, 336 and into and along the second groove 38, 138, 238, 338. As the roller 20 rotates around the bearing pin 12, the oil lubricates the facing surfaces formed by the outer surface 32 of the bearing pin 12 and the inner wall of the roller 20. This maintains the roller 20 and the bearing pin 12 in proper working order.

Figure 17:
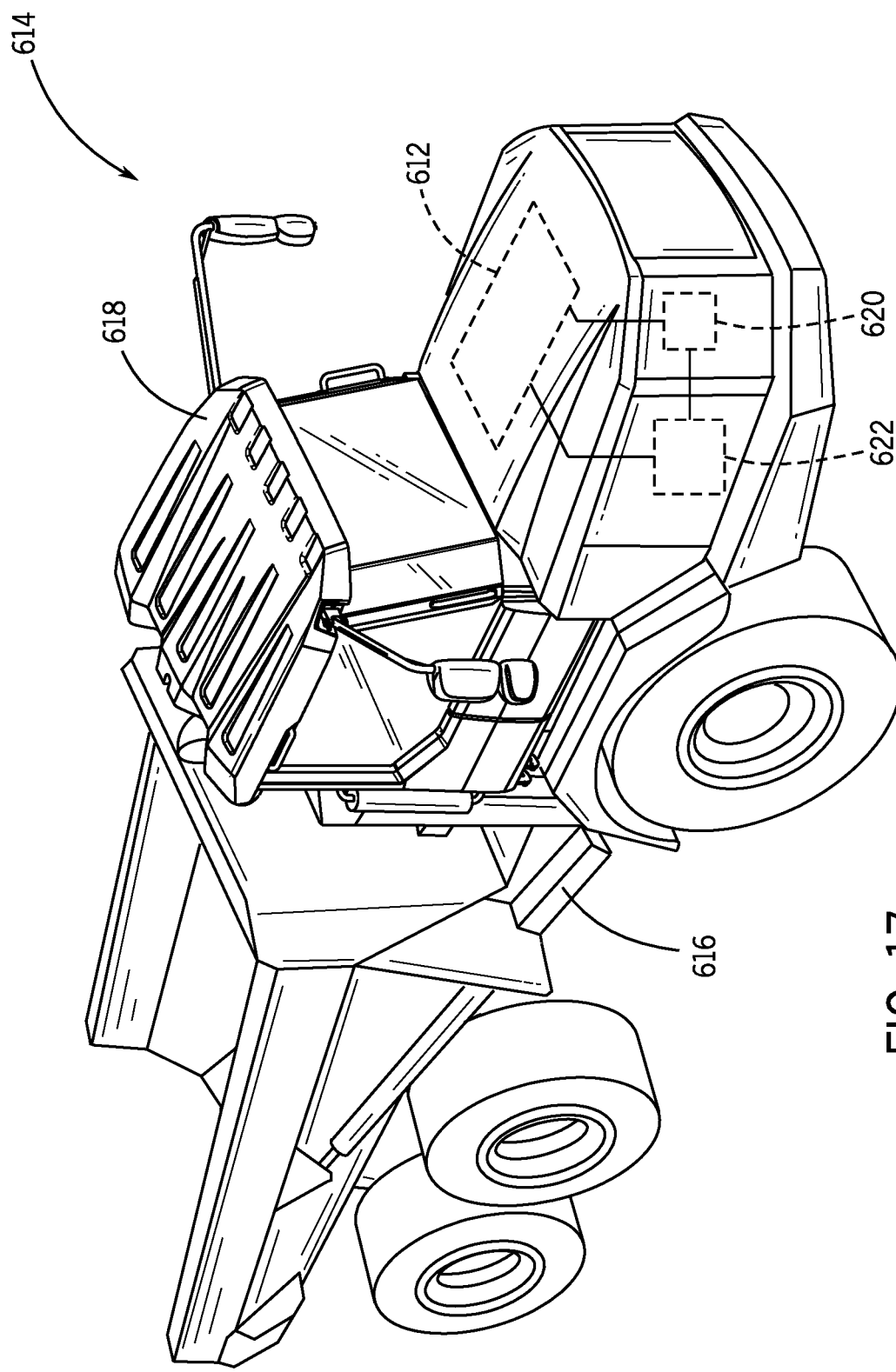
FIG. 17 is an isometric view of an example work vehicle in the form of a dump truck in which the lubricated bearing pin and roller assembly according to this disclosure may be incorporated.

In an embodiment, the lubricated bearing pin and roller assembly 10 is used in an engine and valvetrain and engine arrangement 610 of an internal combustion engine (ICE) 612, such as a diesel engine, of a large on-road and off-road work vehicle 614 as shown in FIG. 17. As shown in the example embodiment, the work vehicle 614 may be considered to include a chassis 616 for carrying heavy loads, an operator cabin 620, a control system 622 and a hydraulic system 624 among other systems and components.

Generally, the ICE 612 supplies power to the work vehicle 614 either along or as part of a hybrid power system in which power from the ICE 612 is supplemented or replaced during certain operational modes by one or more electric machines, fuel cells or other power sources. In the example implementations shown and described herein the ICE 612 is a four-stroke, inline, six-cylinder compression ignition engine with a valvetrain, as detailed below. The ICE 612 may be controlled by an engine control module (not shown) of the control system 622. In addition to providing tractive power to propel the work vehicle 614, the ICE 612 may provide power to various onboard subsystems, including various electrical and hydraulic components of the work vehicle 614, and for off-boarding power to other sub-systems remote from the work vehicle 614. For example, the ICE 612 may provide mechanical power that is converted to an electric format to run the electronics of the control system 622 and one or more electric drives of the work vehicle 614. The ICE 612 may also provide mechanical power that is converted to hydraulic format to power various pumps and compressors that pressurize fluid to drive various actuators of the hydraulic system 624 in order to power wheel steering and various work implements onboard the work vehicle 614. The hydraulic system 624 may include other components (e.g., valves, flow lines, pistons/cylinders, seals/gaskets, and so on), such that control of various devices may be effected with, and based upon, hydraulic, mechanical, or other signals and movements.

The control system 622 may be configured as a computing device with associated processor devices and memory architectures, as a hard-wired computing circuit (or circuits), as a programmable circuit, as a hydraulic, electrical, or electro-hydraulic controller. The control system 622 may be configured to execute various computational and control functionality with respect to the work vehicle 614, including various devices associated with the ICE 612, the hydraulic system 624, and various additional components of the work vehicle 614. In some embodiments, the control system 622 may be configured to receive input signals in various formats (e.g., as hydraulic signals, voltage signals, current signals, and so on), and to output command signals in various formats (e.g., as hydraulic signals, voltage signals, current signals, mechanical movements, and so on).

Figure 18:
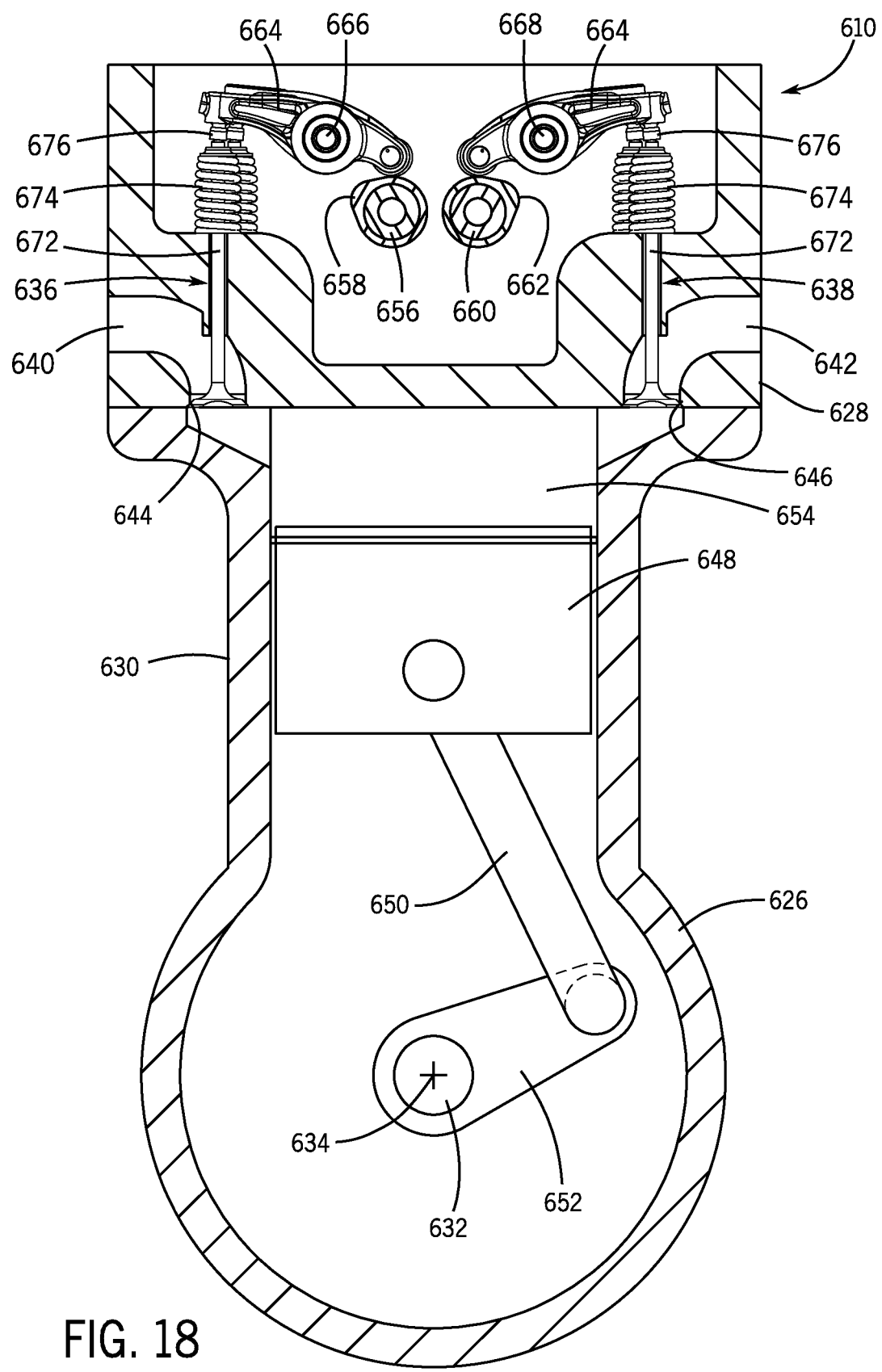
FIG. 18 is an isometric view of an example valve block having an example valvetrain and engine brake arrangement which may be used in the example work vehicle and which includes the lubricated bearing pin and roller assembly.

Referring also to FIG. 18, the ICE 612 includes an engine crankcase 626, a valve block 628 mounted one the engine crankcase 626 to at least partially enclose one or more engine cylinders 630 defined by the engine crankcase 626, and a crank shaft 632 rotatably coupled to the engine crankcase 626 for rotation about a crank axis 634. The valvetrain and engine arrangement 610 is configured to selectively open and close a pair of intake cylinder valves 636 in communication with each engine cylinder 630 and a pair of exhaust cylinder valves 638 in communication with each engine cylinder 630.

As shown in FIG. 18, the valve block 628 includes a pair of intake valve openings 640 (only one of which is shown) extending between and in fluid communication with an intake manifold (not shown) and each engine cylinder 630, and a pair of exhaust valve openings 642 (only one of which is shown) extending between and in fluid communication with an exhaust manifold (not shown) and each engine cylinder 630. Each intake valve opening 640 includes a seat 644 positioned adjacent the engine cylinder 630 and configured to interact with the corresponding intake cylinder valve 636, and each exhaust valve opening 642 includes a seat 646 positioned adjacent the engine cylinder 630 and configured to interact with the corresponding exhaust cylinder valve 638.

Each engine cylinder 630 also includes an engine piston 648 and a connecting arm 650 connecting the engine piston 648 to the crank shaft 632 via a crank arm 652. The engine piston 648 reciprocates within the engine cylinder 630 between a top dead center (TDC) positioned proximate the valve block 628 and a bottom dead center (BDC) position farthest away from the valve block 628 to reduce or enlarge a size of a combustion chamber 654 within the engine cylinder 630. The reciprocating motion of the engine piston 648 within the engine cylinder 630 rotates the crank shaft 632 and crank arm 652 about the crank axis 634 in a first clock direction of rotation. In the illustrated implementation, the ICE 612 is a four-stroke design having a conventional intake stroke, compression stroke, expansion or power stroke, and exhaust stroke in succession. The ICE 612 is operable in a positive power condition in which the ICE 612 drives the crank shaft 632 in the first clock direction of rotation (e.g., applies torque to the crank shaft 632 in the first direction of rotation), and a negative power condition, in which the ICE 612 resists the rotation of the crank shaft 632 and acts as a brake (e.g., applies torque to the crank shaft 632 in a second clock direction of rotation opposite the first clock direction of rotation). The positive power condition of the ICE 612 generally corresponds with combustion cycle operation, while the negative power condition generally corresponds with compression release engine braking operation.

The valvetrain and engine arrangement 610 includes an intake camshaft 656, having intake valve cam lobes 658, for the intake cylinder valves 636 of each engine cylinder 630, and an exhaust camshaft 660, having exhaust valve cam lobes 662, for the exhaust cylinder valves 638 of each engine cylinder 630. The camshafts 656, 660 extend between opposite walls of the engine crankcase 626, are parallel to each other, and are coupled together by intermeshed gears (not shown). Each camshaft 656, 660 may have a portion which is eccentric to form each valve cam lobe 658, 662, or the valve cam lobes 658, 662 may be formed by ramps on the camshaft 656, 660. As such, the term "cam lobe" as used herein encompasses any of various ramps, eccentric lobes and other cam surface profiles. The profiles, the clock or angular position about camshafts 656, 660, or both the profile and the clock position, of the valve cam lobes 658, 662 are different when viewed from the side such that the valve cam lobes 658, 662 interact with their mating components, as described herein, at different times when the camshafts 656, 660 are rotated. The camshafts 656, 660 and the valve cam lobes 658, 662 cooperate with finger followers 664 to seat and unseat the cylinder valves 636, 638. The finger followers 664 may be referred to as some variation of "rocker arms" in the industry, and are referred to in the example described herein as "finger followers" due to the elongated construction and function to seat and unseat the cylinder valves 636, 638 by engagement with or "following" the valve cam lobes 658, 662 as they rotate.

Figure 19:
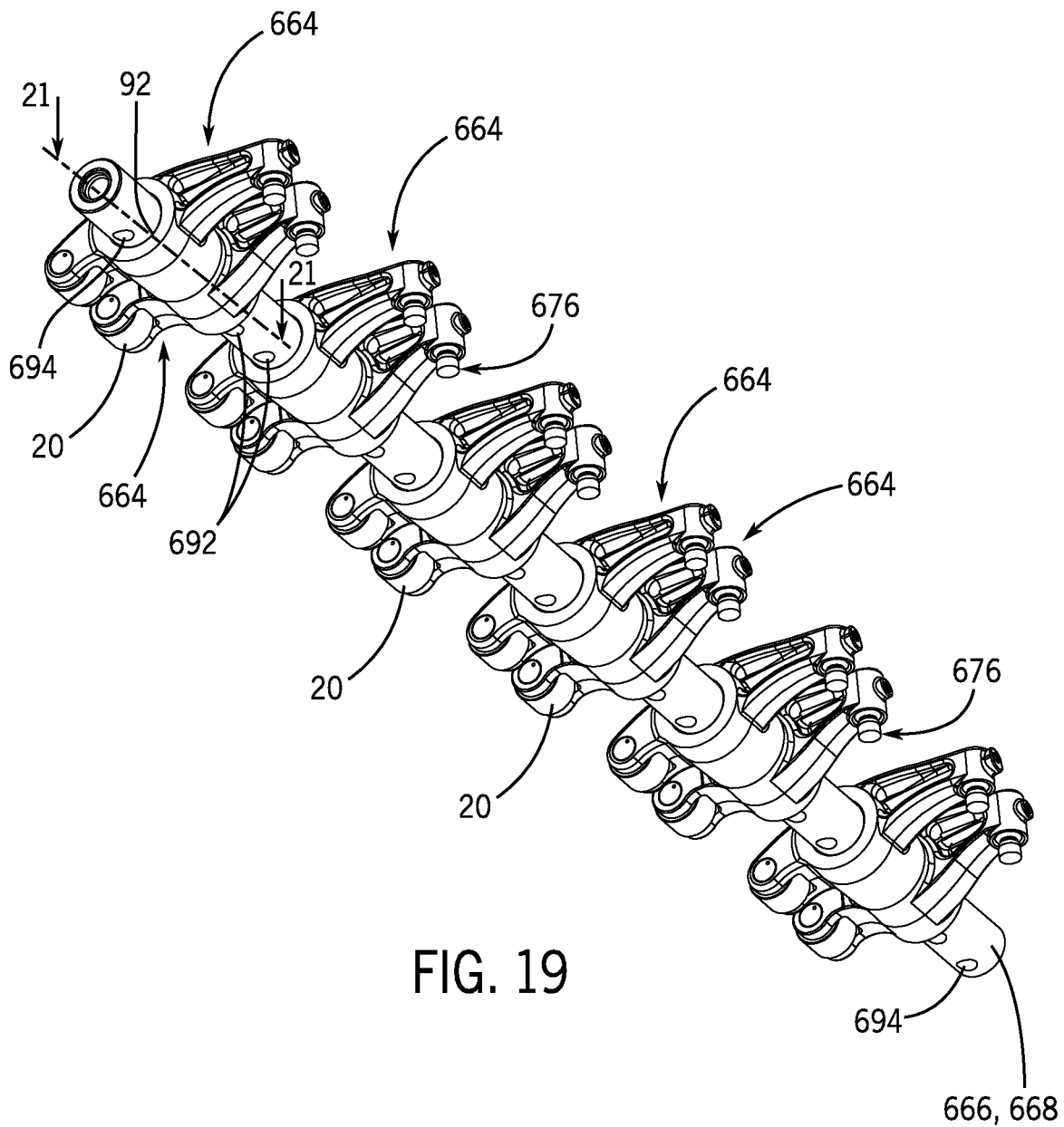
FIG. 19 is an isometric views of certain example valves and valve actuator components used in the example valvetrain and engine brake arrangement.
Figure 20:
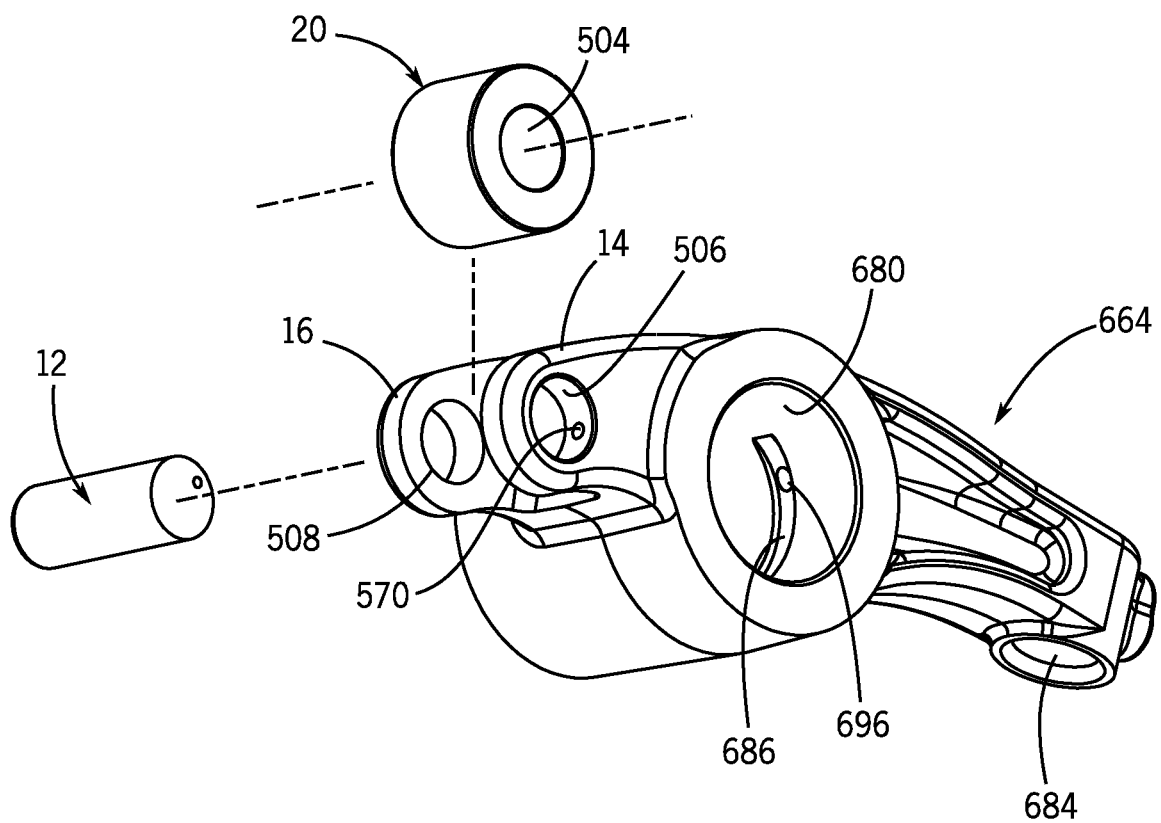
FIG. 20 is an exploded perspective view of a follower of example valvetrain and engine brake arrangement and which includes the lubricated bearing pin and roller assembly.

The intake cylinder valves 636, the intake camshaft 656, and a pair of finger followers 664 which are pivotally mounted on an intake follower shaft 666, see FIG. 19, form an intake apparatus configured to control the flow of gases between the intake valve openings 640 and the combustion chamber 654 of each engine cylinder 630. The exhaust cylinder valves 638, the exhaust camshaft 660 and a pair of finger followers 664 which are pivotally mounted on an exhaust follower shaft 668, see FIG. 19, form an exhaust apparatus configured to control the flow of gases between the exhaust valve openings 642 and the combustion chamber 654 of each engine cylinder 630. Each follower shaft 666, 668 is cylindrical, extends between the opposite walls of the valve block 628, and defines a pivot axis along a longitudinal axis 670 thereof around which the finger followers 664 pivot. The follower shafts 666, 668 are parallel to each other and are parallel to the camshafts 656, 660.

Each cylinder valve 636, 638 includes an elongated valve stem 672 having an enlarged spring retainer proximate an upper tip thereof and a valve head at a lower end thereof. A spring 674 is positioned around the valve stem 672 that has an upper end engaged by the spring retainer. The valve heads of the intake cylinder valves 636 are configured to seat against the seats 644 or be unseated (i.e., "lifted") from the seats 644, and the valve heads of the exhaust cylinder valves 638 are configured to seat against the seats 646 or be lifted from the seats 646. A pivot 676 is provided at the upper tip of each cylinder valve 636, 638. In the illustrated example, the pivot 676 is defined by a lash adjuster, more specifically a hydraulic lash adjuster, as is known in the art, and which is fixed to the valve stem 672 and has a movable component that allows the finger followers 664 to adjust, under hydraulic pressure control, the position for seating of the valve heads (or "lash").

Referring to FIGS. 20-24, each finger follower 664 has a substantially elongated follower section 678 having first and second opposite ends, and a circular aperture 680 provided through the follower section 678. The aperture 680 is offset toward the first end from the midpoint of the follower section 678. A longitudinal axis 682 is defined between the ends of the follower section 678. The follower shaft 666, 668 passes through the aperture 680 of the respective finger followers 664. The first end of the finger followers 664 provides the arms 14, 16 in which the bearing pin 12 and the roller 20 are mounted. The pin axis 34 of the bearing pin 12 is perpendicular to the longitudinal axis 682 of the follower section 678. The second end of each finger follower 664 has a cavity 684 in which the pivot 676 of each cylinder valve 636, 638 seats. The intake follower shaft 666 extends through the apertures 680 of the intake finger followers 664 and the intake finger followers 664 are pivotable around the intake follower shaft 666. The longitudinal axis 670 of the intake follower shaft 666 is parallel to the pin axis 34. Likewise, the exhaust follower shaft 668 extends through the apertures 680 of the exhaust finger followers 664 and the exhaust finger followers 664 are pivotable around the exhaust follower shaft 668. The longitudinal axis 670 of the exhaust follower shaft 668 is parallel to the pin axis 34.

In normal operation of the ICE 612, the camshafts 656, 660 rotate and the intake valve cam lobes 658 on the intake camshaft 656 engage with the outer surfaces of the rollers 20 on the intake finger followers 664, thereby causing the intake finger followers 664 to pivot about their follower shaft 666 and to lift the intake cylinder valves 636 from their seats 644. The exhaust valve cam lobes 662 on the exhaust camshaft 660 do not cause the exhaust finger followers 664 to pivot at this rotational position of the camshafts 656, 660 such that the exhaust cylinder valves 638 remain seated. During the intake stroke, the ICE 612 drives the crank shaft 632 in the first clock direction of rotation (e.g., applies torque to the crank shaft 632 in the first clock direction of rotation), and the engine piston 648 is moved downward creating a partial vacuum that draws a fuel/air mixture (or air alone) through the intake valve openings 640 and into the combustion chamber 654. Once the camshafts 656, 660 rotate such that the intake valve cam lobes 658 no longer engage with the rollers 20 on the intake finger followers 664 sufficiently to effect pivoting, the springs 674 cause the intake cylinder valves 636 to move upward and reseat onto their seats 644, thereby causing the intake finger followers 664 to pivot about their follower shaft 666. The exhaust valve cam lobes 662 on the exhaust camshaft 660 do not cause pivoting of the exhaust finger followers 664 so the exhaust cylinder valves 638 remain seated. During the compression stroke, the fuel/air mixture (or air alone) is compressed to the top of the combustion chamber 654 by the engine piston 648 being moving upward by the ICE 612 driving the crank shaft 632 in the second clock direction of rotation (e.g., applies torque to the crank shaft 632 in the second clock direction of rotation), reducing the volume of the combustion chamber 654. Towards the end of this movement, fuel is injected (if only air was present) and the fuel/air mixture is ignited, by a spark plug or by self-ignition. When the ignited air/fuel mixture expands, the engine piston 648 is pushed downwards, and this causes the expansion or power stroke that creates the ICE 612 power. The camshafts 656, 660 are in a rotated position such that the valve cam lobes 658, 662 are not in contact with the rollers 20 so as to not pivot the finger followers 664 or lift the cylinder valves 636, 638 during the combustion stroke. During the exhaust stroke, the camshafts 656, 660 are rotated to the position where the exhaust valve cam lobes 662 engage with the rollers 20 to pivot the exhaust finger followers 664 about their follower shaft 668, and to lift the exhaust cylinder valves 638 from their seats 646. During the exhaust stroke, the engine piston 648 is moved upward, forcing the gases that were created during the expansion or power stroke out of the combustion chamber 654 through the exhaust valve openings 642. The camshafts 656, 660 continue to rotate and the exhaust valve cam lobes 662 no longer engage with the rollers 20 so as to cause pivoting of the exhaust finger followers 664. The springs 674 cause the exhaust cylinder valves 638 to move upward and reseat onto their seats 646, thereby causing the exhaust finger followers 664 to pivot about their follower shaft 668. The four-stroke cycle then repeats continuously during normal engine operation.

Figure 21:
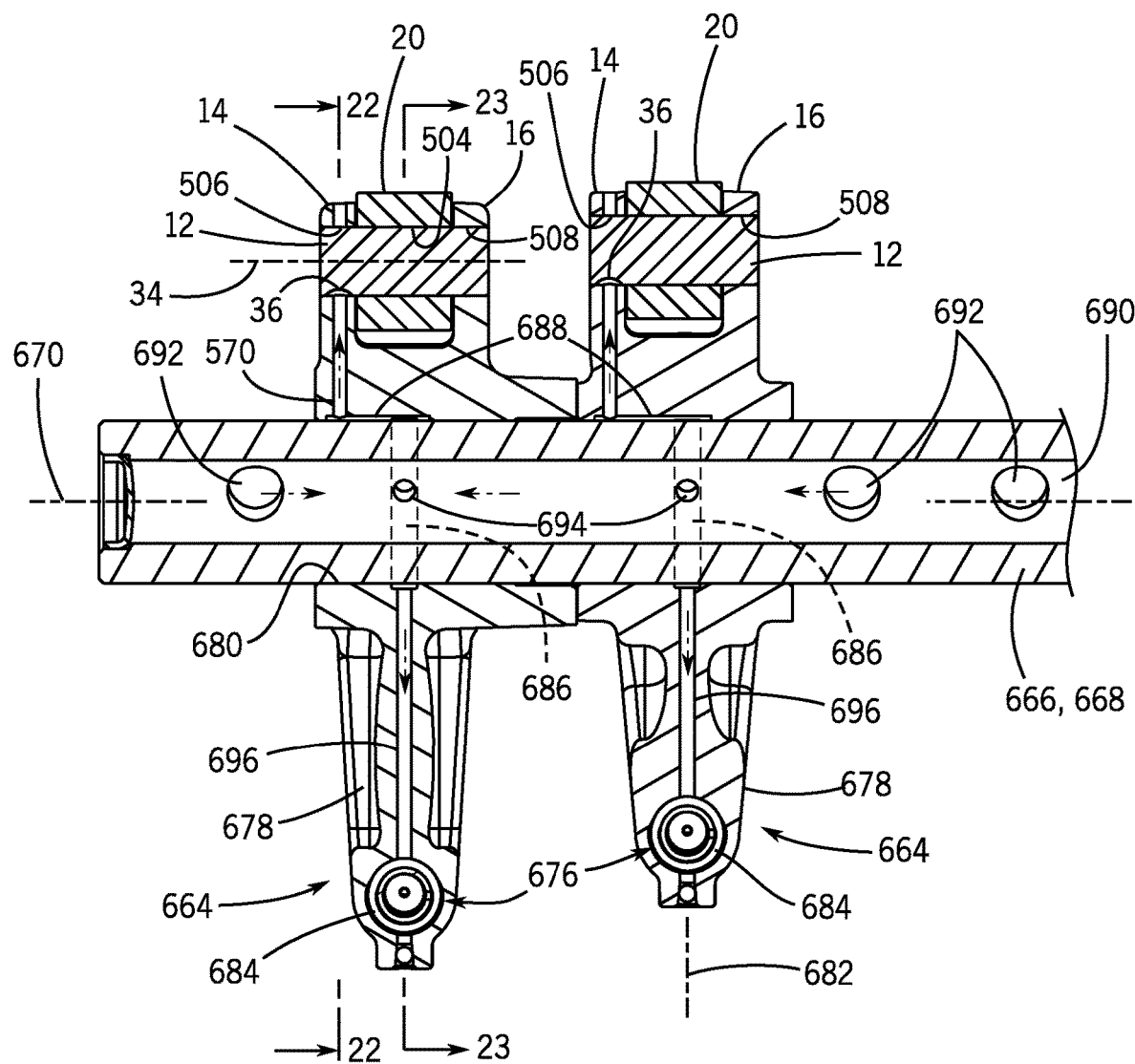
FIG. 21 is a cross-sectional view along line 21-21 of FIG. 19.
Figure 22:
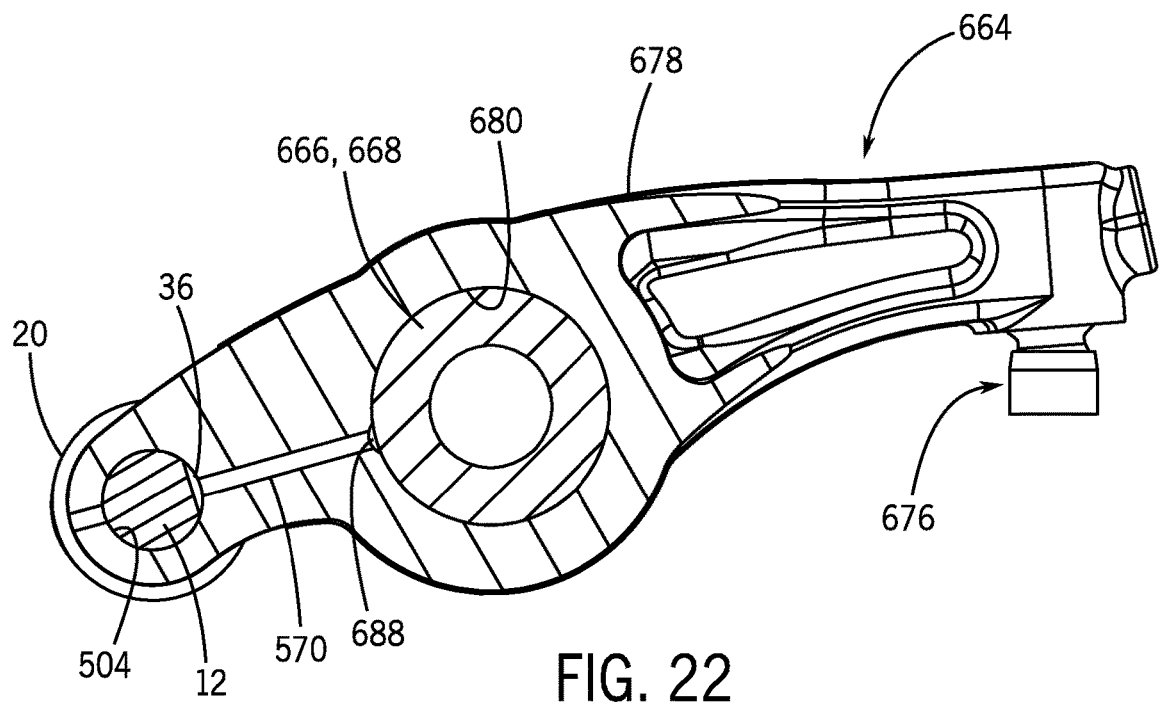
FIGS. 22 and 23 are cross-sectional views along lines 22-22 and 23-23, respectively, of FIG. 21.
Figure 23:
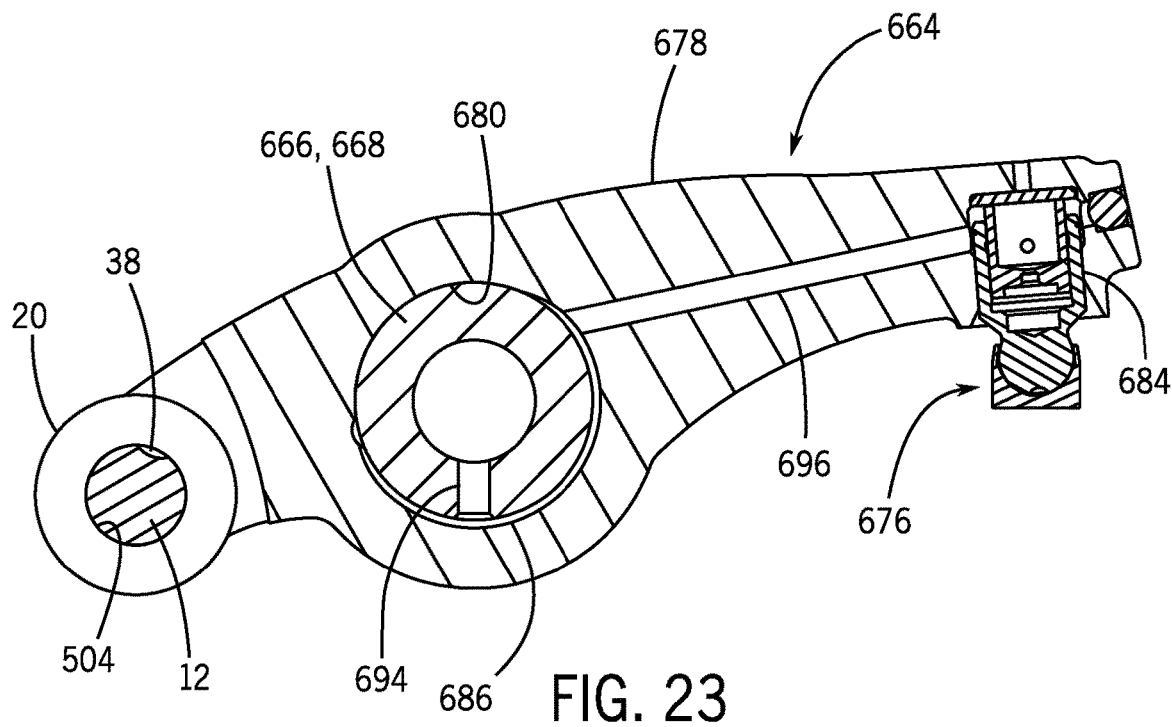

An oil delivery network, see FIGS. 21-23, of which the channel 570 is part, delivers oil to each bearing pin 12 to maintain the lubrication between the bearing pin 12 and its roller 20. As shown in FIG. 21, the oil delivery network includes a first elongated groove 686 in the follower section 678 of each finger follower 664 which extends partially around the circumference of the aperture 680, a second elongated groove 688 in the follower section 678 which extends from the first groove 686 and is parallel to the pin axis 34, and the channel 570 which extends through the follower section 678 and through the arm 14 from the second groove 688 to the opening 506 in which the end of the bearing pin 12 seats. Each follower shaft 666, 668 has a channel 690 extending longitudinally along the length of each follower shaft 666, 668 between the ends thereof, at least one input opening 692 provided therethrough which is offset from the finger followers 664, and an output opening 694 extending therethrough which aligns with the first groove 686. The opposite ends of the channel 690 are closed. Oil flows from a source (not shown), through the at least one input opening 692, and into the channel 690. The oil then flows through the output opening 694, into the first groove 686, into the second groove 688 and then through the channel 570 to exit into the first groove 36, 236, 336 of the bearing pin 12. The oil delivery network may also deliver oil to the cavity 684 in which the pivots 676 seats through a channel 696, see FIG. 23, which extends through the follower section 678 from the groove 686 to the cavity 684 in which the pivot 676 seats for adjustment of the lash.

The foregoing describes one or more example lubricated bearing pin and roller assemblies in detail. Various other configurations are possible within the scope of this disclosure.

Enumerated Examples

Also, the following examples are provided, which are numbered for easier reference.

1. A method of manufacturing a bearing pin with an external lubrication channel, the method comprising: fixing a rotational orientation of the bearing pin along a pin axis, the bearing pin having an outer surface extending about the pin axis between opposite ends; cutting the outer surface of the bearing pin in a first straight line across a first convex portion of the outer surface to create a first open external groove of the lubrication channel that has a concave sectional profile and circumferential open ends disposed intermediate and not intersecting the ends of the bearing pin; and cutting the outer surface of the bearing pin in a second straight line across a second convex portion of the outer surface to create a second open external groove of the lubrication channel that has a concave sectional profile and circumferential open ends disposed intermediate and not intersecting the ends of the bearing pin, the second open external groove intersecting the first open external groove.

2. The method of example 1, wherein a) the first straight line lies in a first plane and the second straight line lies in a second plane at an angle to the first plane, or b) the first straight line lies in a common plane with the second straight line.

3. The method of example 1, wherein the second straight line is at an angle between 0 degrees and 90 degrees relative to a plane in which the pin axis is provided, and/or the first straight line is at a 90 degree angle relative to a plane in which the pin axis is provided.

4. The method of example 1, wherein the cutting steps are performed with a common cutting tool having a convex cutting profile.

5. The method of example 1, wherein the cutting the outer surface of the bearing pin in the first straight line across the first convex portion of the outer surface includes passing a cutting tool completely along the first groove.

6. The method of example 5, wherein the second groove (38, 138, 238, 338) extends radially about the pin axis (32) less than 90 degrees.

7. The method of example 1, further including: cutting the outer surface of the bearing pin in a third straight line across a third convex portion of the outer surface at an angle to and intersecting the second straight line so that the second open external groove is a multi-segment groove with a concave sectional profile and circumferential open ends disposed intermediate and not intersecting the ends of the bearing pin.

8. A bearing pin comprising: a pin body having an outer surface extending about a pin axis between opposite ends; and an open external lubrication channel disposed in the outer surface of the pin body, the lubrication channel having: a first groove extending in a first straight line across a first convex portion of the outer surface, the first groove having a concave sectional profile and circumferential open ends disposed intermediate and not intersecting the ends of the pin body; and a second groove extending in a second straight line across a second convex portion of the outer surface, the second groove having a concave sectional profile and circumferential open ends disposed intermediate and not intersecting the ends of the pin body, the second groove intersecting the first groove.

9. The bearing pin of example 8, wherein the first straight line lies in a first plane and the second straight line lies in a second plane at an angle to the first plane.

10. The bearing pin of example 8, wherein the first straight line lies in a common plane with the second straight line.

11. The bearing pin of example 8, wherein the second straight line is at an angle between 0 degrees and 90 degrees relative to a plane in which the pin axis is provided and/or the first straight line is at a 90 degree angle relative to a plane in which the pin axis is provided.

12. The bearing pin of example 8, wherein the second open external groove has a recessed bottom surface that is arcuate and/or the first open external groove has a recessed bottom surface that is arcuate.

13. The bearing pin of example 8, wherein the second open external groove is radially farther from a plane in which the pin axis is provided at the circumferential open ends than at a midpoint between the circumferential open ends.

14. The bearing pin of example 9, wherein the second groove extends radially about the pin axis less than 90 degrees.

15. The bearing pin of example 8, wherein the second groove has a proximal groove segment extending in the second straight line across the second convex section of the outer surface; and wherein the second groove has a distal groove segment extending in a third straight line across a third convex section of the outer surface at an angle to and intersecting the second straight line; and whereby the second groove is a multi-segment groove with a concave sectional profile and circumferential open ends disposed intermediate and not intersecting the ends of the pin body.

CONCLUSION

The one or more examples discussed above result in a bearing pin having a lubrication channel that has good oil entrainment properties. The geometry of the lubrication channel allows it to be formed with an economical milling and grinding operations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method of manufacturing a bearing pin with an external lubrication channel, the method comprising:
    fixing a rotational orientation of the bearing pin along a pin axis, the bearing pin having an outer surface extending about the pin axis between opposite ends;
    cutting the outer surface of the bearing pin while in the fixed rotational orientation along a first straight line across a first convex portion of the outer surface to create a first open external groove of the lubrication channel that has a concave sectional profile and circumferential open ends disposed intermediate and not intersecting the ends of the bearing pin; and
    cutting the outer surface of the bearing pin while in the fixed rotational orientation along a second straight line across a second convex portion of the outer surface to create a second open external groove of the lubrication channel that has a concave sectional profile and circumferential open ends disposed intermediate and not intersecting the ends of the bearing pin, the second open external groove intersecting the first open external groove.

2. The method of claim 1, wherein the first straight line lies in a first plane and the second straight line lies in a second plane at an angle to the first plane.

3. The method of claim 1, wherein the first straight line is at a different location from the second straight line and the first straight line lies in a common plane with the second straight line.

4. The method of claim 1, wherein the second straight line is at an angle between 0 degrees and 90 degrees relative to a plane in which the pin axis is provided.

5. The method of claim 1, wherein the first straight line is at a 90 degree angle relative to a plane in which the pin axis is provided.

6. The method of claim 1, wherein the cutting steps are performed with a common cutting tool having a convex cutting profile.

7. The method of claim 1, wherein the cutting the outer surface of the bearing pin in the first straight line across the first convex portion of the outer surface includes passing a cutting tool completely along the first groove.

8. The method of claim 7, wherein the second groove extends radially about the pin axis less than 90 degrees.

9. The method of claim 1, further including:
    cutting the outer surface of the bearing pin in a third straight line across a third convex portion of the outer surface at an angle to and intersecting the second straight line so that the second open external groove is a multi-segment groove with a concave sectional profile and circumferential open ends disposed intermediate and not intersecting the ends of the bearing pin.

* * * * *